United States Patent [19]
Loomis et al.

[11] Patent Number: 5,936,572
[45] Date of Patent: Aug. 10, 1999

[54] PORTABLE HYBRID LOCATION DETERMINATION SYSTEM

[75] Inventors: Peter Van Wyck Loomis, Sunnyvale; James M. Janky, Los Altos; John F. Schipper, Palo Alto, all of Calif.

[73] Assignee: Trimble Navigation Limited, Sunnyvale, Calif.

[21] Appl. No.: 08/806,549

[22] Filed: Feb. 25, 1997

Related U.S. Application Data

[63] Continuation of application No. 08/191,984, Feb. 4, 1994, abandoned.

[51] Int. Cl.$^6$ .............................. G01S 5/02; G01S 3/02
[52] U.S. Cl. ........................ 342/357; 342/463; 342/457
[58] Field of Search ................................. 342/357, 457, 342/463, 464, 465

[56] References Cited

U.S. PATENT DOCUMENTS

| | | |
|---|---|---|
| 3,518,376 | 6/1970 | Komen et al. |
| 3,889,264 | 6/1975 | Fletcher. |
| 4,054,880 | 10/1977 | Dalabakis et al. |
| 4,459,667 | 7/1984 | Takeuchi ............................. 342/389 |
| 4,646,290 | 2/1987 | Hills ...................................... 370/84 |
| 4,651,156 | 3/1987 | Martinez ............................. 342/457 |
| 4,660,193 | 4/1987 | Young et al. ........................ 370/11 |
| 4,782,531 | 11/1988 | Karr et al. ........................... 381/14 |
| 4,799,062 | 1/1989 | Sanderford et al. ............... 342/450 |
| 4,806,940 | 2/1989 | Harral et al. ....................... 342/451 |
| 4,816,769 | 3/1989 | Ma ....................................... 329/50 |
| 4,914,735 | 4/1990 | Ichiyoshi ............................ 342/125 |
| 5,023,934 | 6/1991 | Wheeless ............................ 455/45 |
| 5,045,861 | 9/1991 | Duffet-Smith .................... 342/457 |
| 5,073,784 | 12/1991 | Westfall ............................. 342/465 |
| 5,170,487 | 12/1992 | Peek .................................... 455/45 |
| 5,173,710 | 12/1992 | Kelley et al. ....................... 342/463 |
| 5,193,213 | 3/1993 | Chon .................................... 455/45 |
| 5,235,632 | 8/1993 | Raith ................................... 379/59 |

OTHER PUBLICATIONS

*Loran–C User Handbook*, Dept. of Transportation, U.S. Coast Guard, Commandant Instruction M16562.3, May 1990.

Tom Logsdon, *The NAVSTAR Global Positioning System*, Van Nostrand Reinhold, 1992, pp. 17–90.

R.G. Brown, *Introduction to Random Signal Analysis and Kalman Filtering*, Wiley and Sons, 1983, pp. 181–272.

Mark Sturza, "Navigation System Integrity Monitoring Using Redundant Measurements", Navigation, vol. 35 (1988–1989), pp. 483–501.

*Primary Examiner*—Gregory C. Issing
*Attorney, Agent, or Firm*—John Schipper

[57] ABSTRACT

Apparatus and method for determining the present location of a mobile user that carries the apparatus inside or outside buildings and structures within a region R. The apparatus includes a radio location determination (LD) signal module that receives radiowaves from at least three radio LD signal sources, such as FM carrier or subcarrier signals, and an outdoor LD signal module that receives outdoor LD signals from at three other satellite-based or ground-based outdoor LD signal sources, such as GPS, GLONASS or Loran-C signal sources. The radio LD signals and outdoor LD signals are used to (1) determine the location of the radio LD module, (2) determine the location of the outdoor LD module and (3) determine an indicium representing signal strength or signal quality for the radio LD signals and for the outdoor LD signals. The radio LD signal indicium and the outdoor LD signal indicium are compared with threshold values for these indicia, and at most one of the radio LD module location and the outdoor LD module location is selected as the present location of the apparatus user. The radio LD module and the outdoor LD module can be combined in a hybrid portable LD system, or the two modules can be separated from and move independently of each other.

18 Claims, 8 Drawing Sheets

PORTABLE HYBRID LOCATION DETERMINATION SYSTEM

This patent application is a continuation of the patent application entitled "Portable Hybrid Location Determination System", U.S. Ser. No. 08/191,984, filed on Feb. 4, 1994, abandoned, and assigned to the assignee of this patent application.

FIELD OF THE INVENTION

This invention relates to use of two or more location determination systems, where one of these systems may use radio carrier or subcarrier waves, to determine the location of a mobile user of the systems.

BACKGROUND OF THE INVENTION

In recent years, several individual location determination systems have been proposed and applied to provide estimates of varying accuracy for location of an object in special circumstances. For an object located outdoors and away from obstructions such as groups of buildings, a satellite-based LD system such as the Global Positioning System (GPS) or the Global Orbiting Navigation Satellite System (GLONASS) or other similar system can be used to provide location estimates with associated inaccuracies as low as ten meters or less. A ground-based system, such as Loran, Omega, Tacan, Decca, JTIDS Relnav or PLRS, can provide location estimates with associated inaccuracies as low as 60 meters or less in the same situations, using triangulation based on intersections of hyperbolic surfaces. These systems provide object location estimates over regions with diameters of hundreds of kilometers (km) but do not work well where some of the signal sources are obscured by structures outdoors, or when the object to be located is positioned indoors.

Some cellular telephone-based systems also provide estimates of location, using comparison of signal strengths from three or more sources. FM subcarrier signals can be used over smaller regions to estimate the location of an object inside or outside a building or other structure, even where the signal sources have no line-of-sight to the object. Use of cellular-based systems and FM subcarrier systems for location determination tends to be limited to smaller regions, with diameters of the order of 20–50 km.

FM subcarrier signals and AM carrier signals have been used for some types of radio wave communications. In U.S. Pat. No. 3,889,264, Fletcher discloses a vehicle location system in which the unsynchronized AM carrier signals from three or more AM radio stations form hyperbolic isophase grid lines that are used to determine location of a vehicle. The vehicle must be equipped with a three-channel, tunable receiver, and its location must be referenced to an initial known location by counting the number of isophase lines crossed after the vehicle leaves the initial location. Isophase drift is compensated for by subtraction from the count.

Dalabakis et al, in U.S. Pat. No. 4,054,880, disclose a radio navigation and vehicle location system employing three low frequency subcarrier signals received from three radio stations at a three-channel, tunable receiver located on the vehicle. Isophase lines crossed are counted after the vehicle leaves an initial known location. This system, like the Fletcher system, is a delta-position system that determines vehicle location only relative to an initially known location.

U.S. Pat. No. 4,646,290, issued to Hills, discloses use of F.C.C.-approved Subsidiary Communication Authorization (SCA) FM subcarrier signals for one way transmission. This patent discloses transmission of a plurality of messages, which may be delivered to the transmitter at a wide range of bit rates, to be transmitted at a single bit rate that is at least as large as the highest bit rate for message delivery. This method allows for downstream insertion of additional data.

An integrated radio location and communication system for a mobile station is disclosed by Martinez in U.S. Pat. No. 4,651,156. Each mobile station carries a transceiver that issues radio signals that are received by two or more signal transceiver reference sites having fixed, known locations. The transceivers at the mobile station and the reference stations are continuously phase locked to the RF carrier signal from a nearby commercial radio station. The radio station and the mobile station each transmit a brief, distinguishable range tone at a known sequence of times, and the range tone from each station is received by each reference station. From an analysis of the differences in arrival times of the range tones received from the radio station and from the mobile station, the reference stations determine the two-dimensional location of the mobile station. The mobile station uses the beat signal between two RF subcarrier frequencies to generate its range tone signal and to distinguish that mobile station transmissions from the transmissions of any other mobile station.

Young et al, in U.S. Pat. No. 4,660,193, disclose use of two SCA FM subcarrier signals, the first being amplitude modulated and the second being phase modulated, to provide a digital data transmission system. A subcarrier signal within this system may also be modulated to carry audio signals.

A multichannel FM subcarrier broadcast system that provides a sequence of relatively closely spaced channels, using independent sidebands of suppressed carriers, is disclosed by Karr et al in U.S. Pat. No. 4,782,531. The sideband signals are generated in pairs and are phase shifted before transmission. Upon receipt of the transmitted signals, the process is reversed. An earlier patent, U.S. Pat. No. 3,518,376, issued to Caymen and Walker, discloses a similar approach without use of signal phase shifting of pairs of sideband signals.

In U.S. Pat. No. 4,799,062, Sanderford et al disclose a radio location method that uses a central processing station, a plurality of signal repeater base stations with fixed, known locations, and a mobile station with a known location at any time. The central station transmits a master grid synchronization pulse, which serves as a time reference, to the other stations at a selected sequence of times. A roving station with unknown location transmits a pulse that is received by three or more base stations and is retransmitted to the central station. The central station determines the location of the roving station using the differences in time of arrival at each base station of the pulse transmitted by the roving station. The mobile station (with known location) also transmits a pulse from time to time, and its known location is compared with its computed location by the central station to determine any multipath compensation required to reconcile the known and computed locations of the mobile station. The multipath compensation for a mobile station adjacent to the roving station is applied to correct the computed location of the roving station.

Ma, in U.S. Pat. No. 4,816,769, discloses receipt of SCA FM subcarrier signals for digital data paging at a radio receiver. The system measures signal-to-noise ratio of an output amplitude of a Costas loop, used to phase lock to the FM subcarrier frequency, to determine if the signal is sufficiently strong to be processed.

A system for detection of radio wave propagation time, disclosed by Ichiyoshi in U.S. Pat. No. 4,914,735, uses detection of phase differences for transmission of the signal over M ($\geq 2$) different known signal paths to a target receiver. The transmitted signal includes a subcarrier signal, having a frequency that is higher than the transmitter clock frequency, modulated with a known modulation signal. The receiver has M demodulators for the signals received by the M different paths and has a phase comparator to compare the computed phases for each of these received signals. The phase differences are proportional to the signal path length differences, if compensation for transmission line distortions is included.

U.S. Pat. No. 5,023,934, issued to Wheeless, discloses a system for communication of graphic data using radio subcarrier frequencies. The data are broadcast on a subcarrier channel and received by a radio receiver that is connected to a computer. The computer receives the subcarrier signals, displays the graphic data on a computer screen, and performs other functions, such as transmission error checking and modification of the displayed graphic data. The system is intended for weather data communication and display.

Westfall, in U.S. Pat. No. 5,073,784, discloses a system for location of a transmitter ("unknown") at large distances, using a large network of pairs of spaced apart radio wave receivers whose locations are known and whose relative phases are synchronized. A signal, broadcast by the unknown transmitter at less than HF frequencies, is received at different time and space points by pairs of receivers. Simple geometrical computations allow determination of the location of the unknown transmitter by comparing times of arrival of the transmitted signal.

U.S. Pat. No. 5,170,487, issued to Peek, discloses use of FM sub-carrier signals for a pager system for mobile users. A plurality of transmitters are used, each of which transmits an FM subcarrier signal or a carrier signal modulated with a chosen message signal, slightly offset in time. Each page-receiving unit is assigned a time slot, during which the receiving unit dials through the set of frequencies corresponding to the FM subcarrier and modulated-carrier signals to determine if a page message has been sent for that mobile user.

A system that allows determination of an absolute location of a vehicle is disclosed by Kelley et al in U.S. Pat. No. 5,173,710. FM subcarrier signals are received from three radio stations with known locations but unknown relative phases by signal processors at the vehicle and at a fixed station with known location relative to the three radio stations. The fixed station processor determines the relative phases of the three radio stations FM subcarrier signals and broadcasts this relative phase information to the vehicle. The vehicle processor receives this relative phase data and determines its absolute location, using the phases of the FM signals it senses at its own location.

Chon, in U.S. Pat. No. 5,193,213, discloses an FM broadcast band system for receipt of relatively high frequency FM subcarrier signals. A tunable high pass receiver first circuit receives the carrier and a tunable low pass second circuit receives the subcarrier signal. Each signal can then be separately processed.

A navigation and tracking system using differential LORAN-C or differential Decca signalling is disclosed by Duffett-Smith in U.S. Pat. No. 5,045,861. A reference station transmits a reference signal to a mobile station and to three or more local LORAN-C or Decca (fixed) stations having known locations relative to the reference station. The fixed stations retransmit the reference signal to the mobile station, where the phase received signal differences are compared to determine the location of the mobile station.

Most of these systems use a single communication system, rather than integrating two or more communication systems to provide location or navigation information for a mobile user. The systems that use FM signals are limited to a region with a diameter of about 50 km or less. Any LD system that uses a plurality of radio carrier or subcarrier signals to determine location of a user must, at some point, determine the relative phases of these signals in order to estimate, by triangulation or related techniques, the user location. If the apparatus that determines these relative phases is fixed in location, this limits the flexibility and the. size of the region over which the LD system can be deployed. What is needed is apparatus: (1) that permits accurate estimation of the location of an object wherever the object is located on or near the Earth's surface and over regions of diameter hundreds or even thousands of km in diameter; (2) that is mobile or portable; (3) that can work indoors or outdoors; (4) that can provide estimates of location with inaccuracies no greater than ten meters, and more preferably no greater than one meter; and (5) that can determine the relative phases of radiowave carrier or sub-carrier signals used as part of a hybrid LD system to determine the location of a mobile user. Preferably, the system should allow a choice between location information provided by two or more location determination systems, based on a comparison of one or more parameters that measure signal robustness and/or signal quality and/or system location for the signals received and analyzed by each communication system. Preferably, in one mode of operation the system should allow determination of location using three fixed signal sources and a mobile phase detection source.

SUMMARY OF THE INVENTION

These needs are met by the invention, which provides an integrated, mobile or portable system for location determination that combines beneficial features of two or more LD systems. The invention is method and apparatus for determining the location of an object or user, or of a signal antenna or receiver carried or transported by the user. The system includes three or more spaced apart transmitters of radiowaves (e.g., FM carrier or subcarrier), operating with different radio carrier frequencies or with subcarrier frequency displaced from the carrier frequency $f_C$ by a selected amount or a multiple thereof, with each radio transmitter being positioned at fixed, known locations, such as nearby radio stations. The system also includes a portable radio carrier or subcarrier signal antenna and receiver/processor, located at the user whose location is to be determined, that receives and analyzes the radio carrier or subcarrier signals and determines the location of the FM antenna at selected times. FM subcarrier signals can be received at substantially all locations outside or inside a building or structure, if the FM subcarrier signal transmitter is within a selected distance of no more than about 50 km from the FM antenna and receiver. Each of the transmitted radio LD signals has an associated phase that may be known initially but that may change from time to time. This radio LD system may operate in a manner parallel to, but different from, the FM subcarrier signal system disclosed by Kelley et al in U.S. Pat. No. 5,173,710, discussed above.

The system also includes a second mobile or portable LD system, referred to here as an "outdoor LD system" and integrated with the radio LD system, that may be a GPS, GLONASS or other satellite-based positioning system (SATPS) or a ground-based system such as Loran, Omega, Tacan, Decca, JTIDS Relnav or PLRS. The outdoor LD system has an LD signal antenna and receiver/processor that receives LD signals and is positioned at the location of the user. The outdoor LD system operates independently of the radio LD signal system, and each of these systems can determine the present location of the user at selected times. The outdoor LD system includes a mobile radio signal monitor that receives the radio LD signals and determines the relative phases of these radio LD signals from time to time as part of the LD process.

The radio LD system and the outdoor LD system are electrically connected by an LD controller that (1A) determines a signal quality parameter (e.g., signal strengths or signal-to-noise ratios) of the LD signals used with each LD system or (1B) estimates the user location, using at least one of the LD systems, and (2) selects the more appropriate LD system, based upon relative signal quality or estimated user location, to provide the user location and displays visual or audible indicia of this user location.

Determination of the location of a mobile user by employing signals from two or more LD systems offers the advantage that each of these LD systems can be utilized in situations where that system is most likely to provide an accurate estimate of the location. The invention uses a combination of radiofrequency carrier or subcarrier waves and another source of electromagnetic (em) waves to allow location determination for a mobile user inside a building or other structure as well as outside such structures. Where radiofrequency carrier or subcarrier waves are used for location determination of the user(e.g., inside a building or other structure), the LD signals are received from three or more radio signal sources with fixed, known locations. A mobile radio LD signal monitor, part of the outdoor LD system, determines the relative phases of the radio signals from time to time as part of the LD process here.

In one mode of operation, the radio LD system and the outdoor LD system are positioned adjacent to each other and form a single, integrated, hybrid LD package or system that can be moved around with the user. The outdoor LD system includes a radio LD signal monitor that receives the radio LD signals, determines the relative phases of these radio LD signals, and provides this relative phase information for use by the radio LD system.

In another mode of operation, the radio LD system is portable, moves with the user, and is not physically attached to the mobile outdoor LD system, which may also be portable or mobile. The outdoor LD system again includes a radio LD signal monitor that receives the radio LD signals, determines the relative phases of these radio LD signals, and provides this relative phase information for use by the radio LD system, using a cable or wireless link between the outdoor LD system and the radio LD system. Here, the radio LD system and the outdoor LD system are physically separated and can move independently of each other, but these two systems form an integrated, hybrid LD system.

The outdoor LD unit can serve solely as a radio LD signal monitor that determines its own location and provides radio LD signal relative phase information for the radio LD unit. Alternatively, the outdoor LD unit can provide a separate determination of user location and complement the radio LD unit's LD process. In this latter approach, the integrated system compares a signal robustness parameter, such as received signal strength, or a signal quality parameter, such as signal-to-noise ratio, or estimates location to determine whether the radio LD signals or the outdoor LD signals will be used to determine the present location of the object or user that carries the apparatus.

BRIEF DESCRIPTIONS OF THE DRAWINGS

FIGS. 1, 3, 4 and 5 schematically illustrate use of the invention in three embodiments.

DESCRIPTION OF BEST MODES OF THE INVENTION

Figure 1:
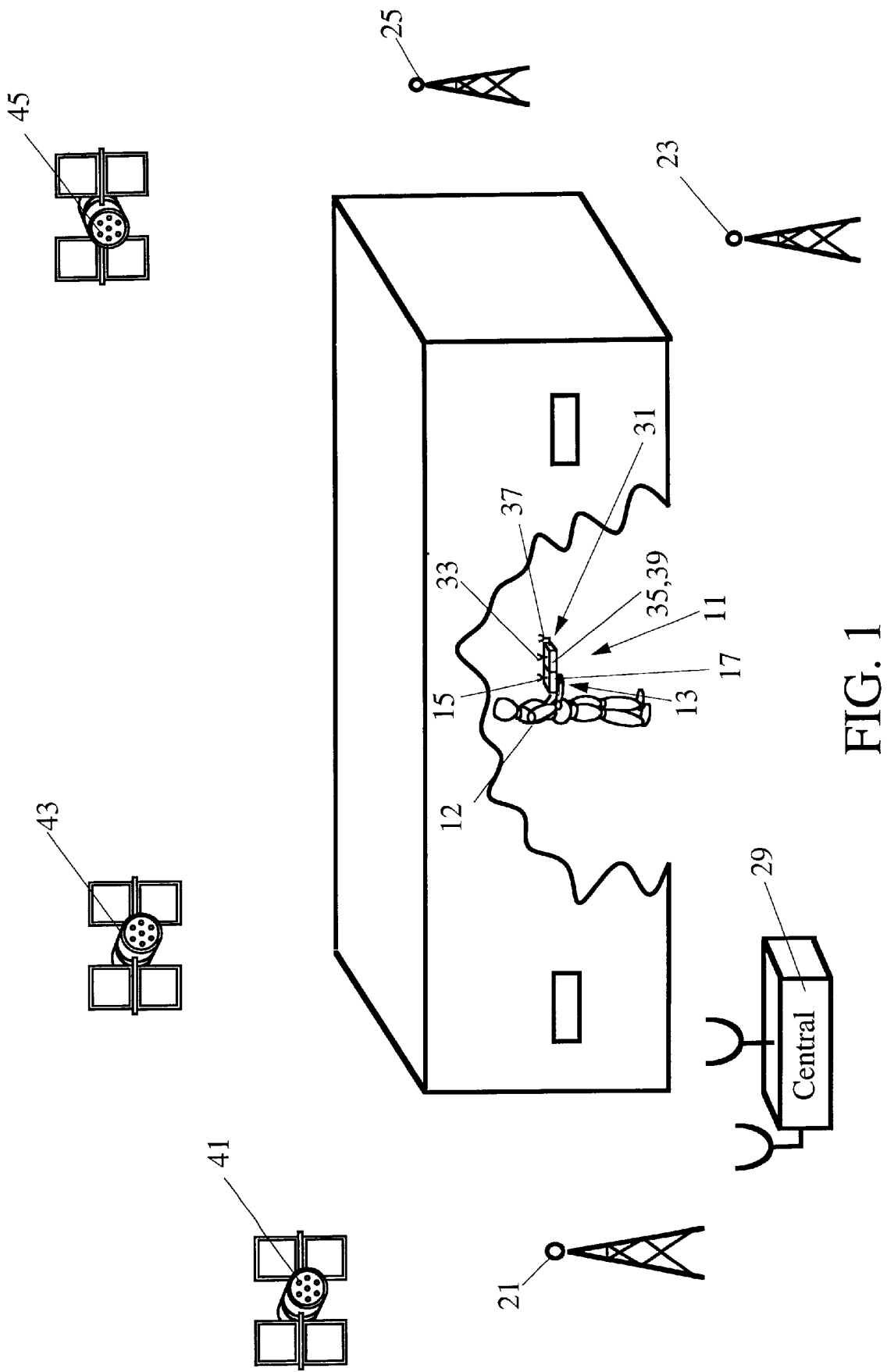

In FIG. 1, a hybrid LD system 11 is carried or transported by or attached to a user 12 and includes a radio LD unit 13. The radio LD unit 13 preferably includes an FM carrier or subcarrier signal antenna 15 and FM subcarrier signal receiver/processor 17. The radio LD unit 13 receives radio LD signals from three or more radio LD signal sources 21, 23 and 25 that have fixed locations with known location coordinates $(x_m, y_m, z_m)$ for radio LD signal source no.m (m=21,23,25).

An FM subcarrier signal may have an associated frequency of about $f_c \pm 19$ kHz, where $f_c$ is the FM carrier frequency that lies in the range 88–108 MHz. Alternatively, a higher order displacement from the carrier frequency (e.g., $f_c \pm 38$ kHz or $f_c \pm 57$ kHz) may be used, as permitted by F.C.C. regulations. The sources of these FM subcarrier signals may be a plurality of FM broadcasting stations located in or near the user 12. In this event, the subcarrier signals are obtained by filtering and sequentially demodulating the total FM signals (carrier signal plus message signal plus subcarrier signal) to remove all but a subcarrier signal of a chosen frequency. The FM subcarrier signal antenna 15 receives the FM subcarrier signals and passes these signals to the associated receiver/processor 17 for determination of the estimated present location of the FM antenna 15.

The relative phases of the radio signals transmitted by the sources 21, 23 and 25 may change from time to time. When the radio LD unit 13 is provided with a recent measurement of these relative phases, the radio LD unit can determine the location of its antenna 15, using intersections of three or more hyperboloids that are defined by the relative times of arrival of the three radio LD signals at the antenna. The receiver/processor 17 also receives radio LD signal phase information that is used in determination of the estimated present location of the radio LD antenna 15. The embodiment shown in FIG. 1 also includes a second (outdoor) LD system 31 that is a satellite-based positioning system (SATPS), such as GPS, GLONASS or a similar system.

Figure 2:
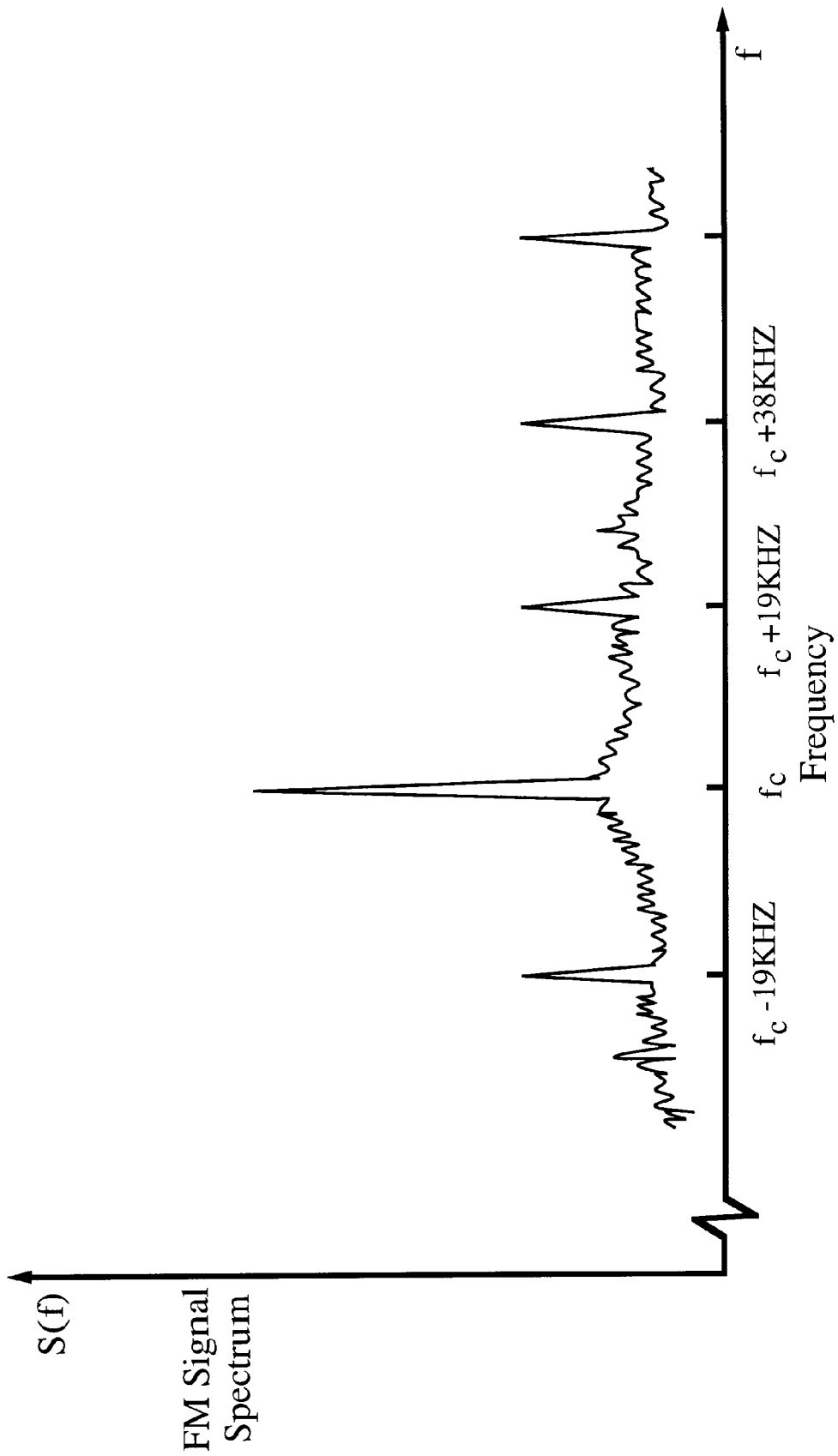
FIG. 2 is a graphical view of a representative FM subcarrier signal spectrum used in the invention.

FIG. 2 illustrates the full FM signal spectrum and the useful portion of the signal that remains ($f_c \pm 19$ kHz) after frequency filtering. FM subcarrier signals can be used for all monitoring of the present location of a user 12, which may be a person or an inanimate object such as a controllable ambulatory machine or robot, inside and outside buildings and other structures. This approach has the advantage of simplicity: only one set of radiowaves is used for location determination. FM signals are less subject to noise and other interference than are other signals, such as AM signals. Alternatively, an FM carrier or subcarrier signal can be replaced by an AM carrier or subcarrier signal, obtained by filtering an AM signal at a frequency referenced to the AM carrier frequency. Alternatively, determination of the present location of the user 12 can be made using a radio LD unit that receives and analyzes radio LD signals transmitted from two or more radio LD signal sources.

The hybrid LD system 11 shown in FIG. 1 includes a satellite-based outdoor LD unit 31, also carried or transported by or attached to the user 12. This outdoor LD unit 31 includes an outdoor LD signal antenna 33 and associated outdoor LD signal receiver/processor 35 that receive outdoor LD signals from three or more satellites 41, 43, 45 whose locations at any time are known with acceptable accuracy. The antenna 33 receives the outdoor LD signals and the receiver/processor 35 determines the present location of this antenna, using well known techniques. The Global Positioning System (GPS) and the Global Orbiting Navigation Satellite System (GLONASS) are two suitable examples of satellite-based outdoor LD systems and are discussed in detail below.

The outdoor LD unit 31 in FIG. 1 includes a radio LD signal antenna and receiver/processor 37 and controller/interface 39 that also receives radio LD signals from the radio LD sources 21, 23 and 25, determines the relative phases of these radio LD signals, and provides this relative phase information with little or no time delay for use by the radio LD unit 13. In FIG. 1, the radio LD unit 13 and the outdoor LD unit 31 are adjacent to each other and are both carried by, transported by, or attached to the user 12. The outdoor LD unit 31 determines the (approximate) location of itself and of the adjacent radio LD unit 13 and uses this information in determining the relative phases of the radio LD signals transmitted by the sources 21, 23 and 25. Use of a mobile outdoor LD unit 31 to receive radio LD signals and to determine the relative phases of such signals is an important feature of the invention.

In one mode of operation in FIG. 1, the outdoor LD unit 31 serves only as a mobile radio LD signal monitor 37, for which present location can be approximately determined. In another mode of operation, the outdoor LD unit 31 also complements the radio LD unit 13 by providing an independent determination of location of the hybrid LD unit 11.

Figure 3:
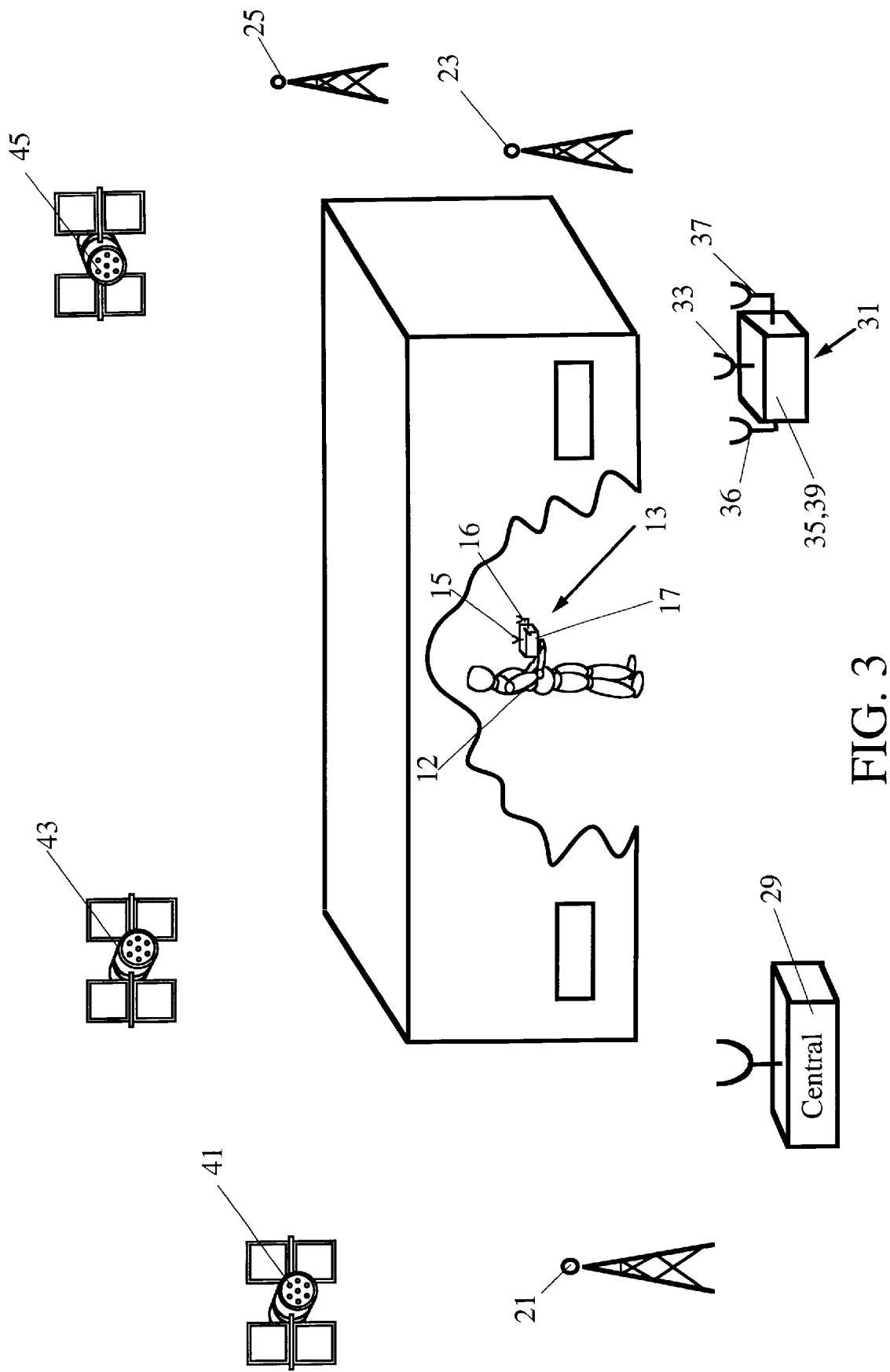

FIG. 3 schematically illustrates a second mode of operation of the invention, in which the radio LD unit 13 is made portable and moves with the user 12, independently of movement of, and spaced apart from, the outdoor LD unit 31. The radio LD unit 13 and the outdoor LD unit 31 are parts of an integrated hybrid LD system, as before, but these two units no longer are part of a single package. In the mode shown in FIG. 3, the outdoor LD unit 13 includes a radio LD signal phase information antenna 16 that receives information on the relative phases of the radio LD signals transmitted by the radio LD sources 21, 23 and 25. These radio LD signals are received by a radio LD signal monitor 37 that may be part of the outdoor LD unit 31, and the relative phases of these signals are determined by the monitor 37, as before. The outdoor LD unit 31 transmits this relative phase information to the radio LD signal phase information antenna 16, using another antenna and transmitter 36. The radio LD unit 13 can then determine its present location, as before. In this mode, the outdoor LD unit 31 serves only as a mobile radio LD signal monitor that can determine its own location. Here, the mobile outdoor LD unit 31 is positioned at a convenient location and communicates with the portable radio LD unit 13 carried by the user 12.

Figure 4:
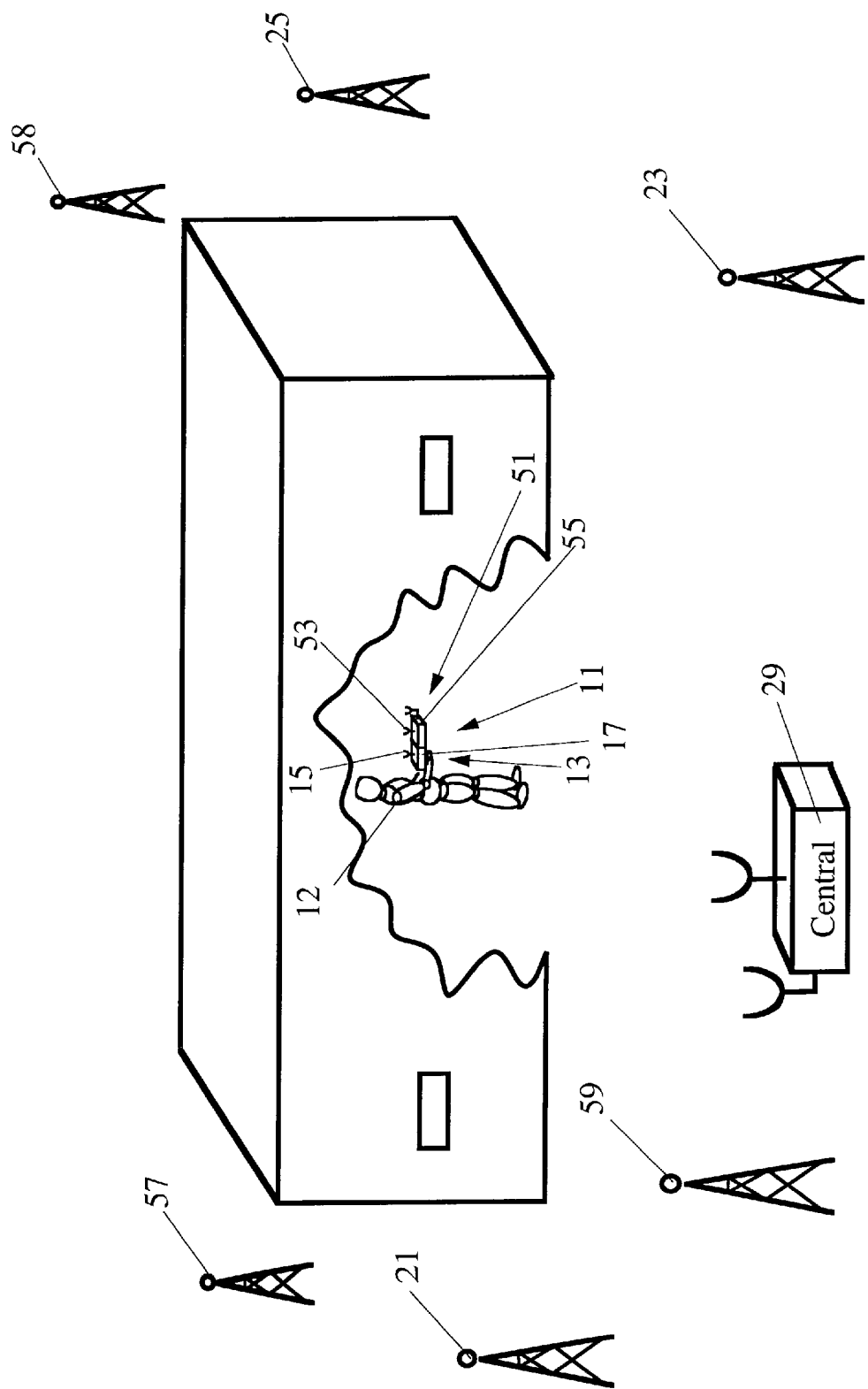

FIG. 4 schematically illustrates use of the invention with a ground-based outdoor LD unit 51, attached to or carried by the user 12, replacing the satellite-based outdoor LD unit 31 in FIG. 1. This outdoor LD unit 51 includes an outdoor LD signal antenna 53 and associated outdoor LD signal receiver/processor 55 that receive outdoor LD signals from three or more ground-based LD signal sources 57, 58 and 59, whose locations at any time are known with acceptable accuracy. The antenna 53 receives the outdoor LD signals and the receiver/processor 55 determines the present location of this antenna, using well known techniques. Suitable ground-based outdoor LD systems include Loran, Omega, Tacan, Decca, JTIDS Relnav and PLRS, each of which is discussed below. All other components shown in FIG. 4 are as in FIG. 1.

Figure 5:
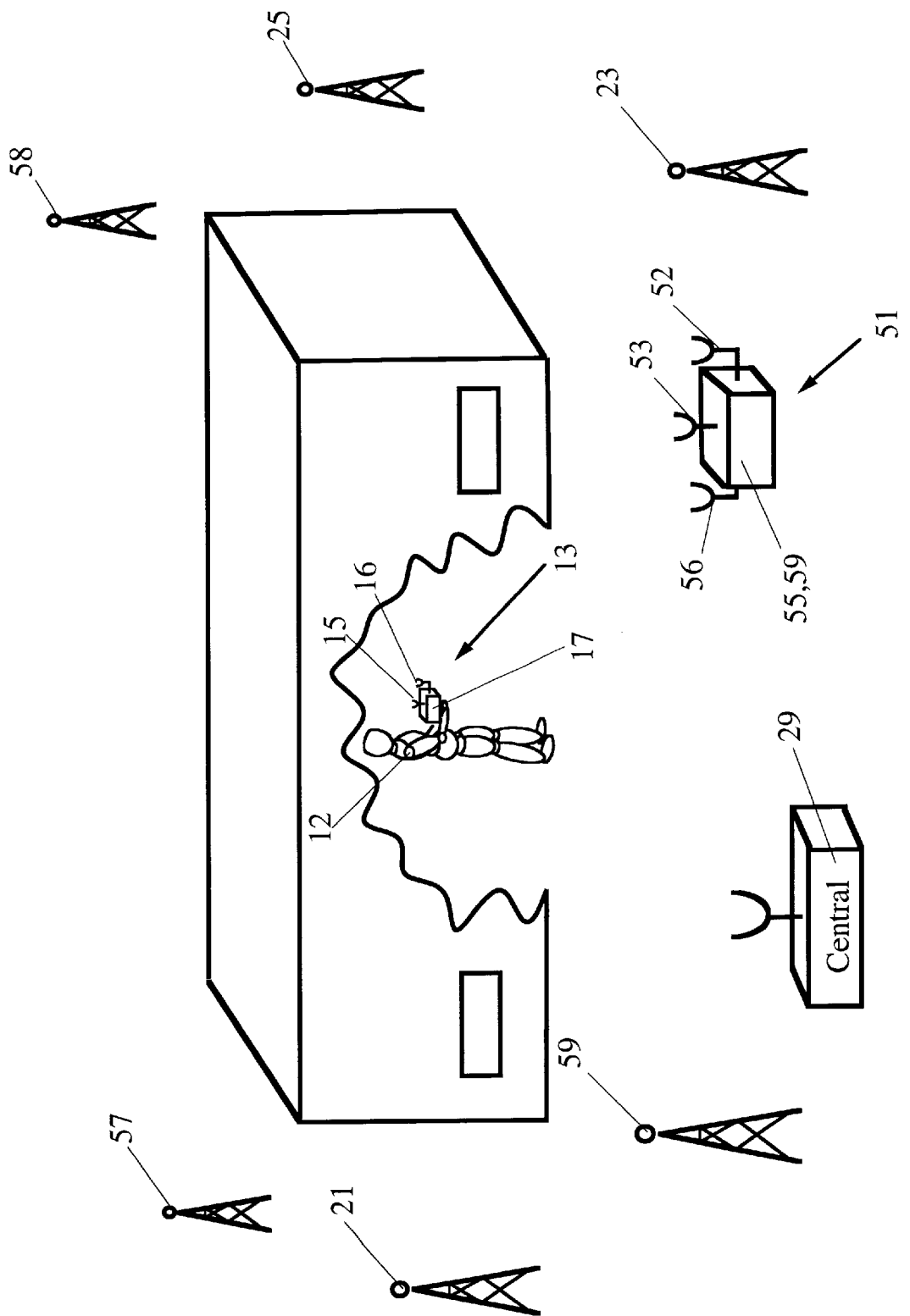

FIG. 5 is analogous to FIG. 4, except that the outdoor LD unit 51 is physically separated from the portable radio LD unit 13, which is carried by the user 12. Here, the outdoor LD unit 51 also includes a radio LD signal monitor and associated antenna 52 that receives the radio LD signals, determines its own present location, and determines the relative phases of the radio LD signals transmitted. The outdoor LD unit 51 then transmits this relative phase information to the phase information antenna 16 on the radio LD unit 13, as was done in FIG. 3.

Information contained in the radio LD signals and/or in the outdoor LD signals may be fully processed at the respective receiver/processor for those signals. Alternatively, information from the radio LD signals and/or the outdoor LD signals may be transmitted, unprocessed or partly processed or fully processed, to a central processing station 29 (optional), located at or near the site R, to allow determination of the present location of the user 12 at selected times (e.g., second-by-second, or more or less often, if desired). If all signal processing of the radio LD signals and/or the outdoor LD signals occurs at the central station 29, the FM radio LD signal receiver/processor 17 and/or the outdoor LD signal processor 35 or 55 may be deleted in FIGS. 1, 3, 4 or 5. The central station 29 may be deleted if all processing, use and display of the present location information occurs at the hybrid LD unit 11 or at the radio LD unit 13.

If the user 12 is outdoors or is within any building or other structure that is not electromagnetically isolated, the LD signals may have any frequency, and GPS, GLONASS, Loran, Omega, Tacan, Decca, JTIDS Relnav or PLRS signals, FM subcarrier signals, or other radiowave signals may be used. If the user 12 is within an electromagnetically isolating structure, FM subcarrier or other radio LD signals may often still be received within the structure without disabling signal attenuation or signal distortion, as long as the structure does not form a complete Gaussian surface.

In the embodiments illustrated in FIGS. 1, 3, 4 and 5, the invention uses three FM subcarrier signals (or other radio LD signals) emitted by three or more spaced apart radio LD signal sources 21, 23 and 25, positioned at fixed, known locations, together with a mobile radio LD signal monitor 32 or 52, located at a variable but determinable location that is separated by a large distance from a plane P(21,23,25) defined by the locations of the three radio LD signal sources 21, 23 and 25. This mobile radio LD signal monitor 32 or 52 might be located on a tall hill, for example, relative to the heights of the transmitting antennas of the radio LD signal sources 21, 23 and 25. The user 12 carries or is attached to the portable LD unit 13 and is assigned an identifying indicium that is included in any transmission by that LD unit to the central station 29.

In normal circumstances, the relative phases of the radio LD signal sources 21, 23 and 25 would not change, or would change at most a few times in any 24-hour period. However, the invention provides for the possibility that these relative phases can change often and/or quickly. At or around a given time t=t0, the radio LD signals broadcast by the sources 21, 23 and 25 are assumed to be $$S_m(t)=S_0 exp[j(\omega_m t-\phi_m)] (m=21,23,25)(j^2=-1), \quad (1)$$

where $\omega_m$ and $\phi_m$ are the radio LD signal frequency and present phase of the radio LD signal source number m. The radio LD signal frequencies $\omega_m$ are preferably distinct from and spaced apart from one another. Optionally, the radio LD signal $S_m(t)$ may itself be modulated with a known signal to produce a signal $S_{m,mod}(t)$ that is different for each source (m) and that allows identification of each source signal, independently of whether the frequencies are distinct. The radio LD signals are received at the radio LD unit 13 as time-varying signals of the form $$S'_m(t)=S_0 exp[j(\omega_m t-\phi_m-\omega_m d_m/c')] (m=21,23,25), \quad (2)$$

where c' is the average propagation velocity in the transmission medium (mostly air) and $$d_m=[(x-x_m)^2+(y-y_m)^2+(z-z_m)^2]^{1/2} \quad (3)$$

is the distance from the radio LD signal source number m to the hybrid LD unit 11 or to the radio LD unit 13, whose present location coordinates (x, y, z) are as yet undetermined.

If the phases $\phi_m$ are known, the distances $d_m$ can be determined from Eq. (2). From any three physically realistic three distances, such as $d_{21}$, $d_{23}$ and $d_{25}$, two candidate location coordinate triples (x,y,z) can be found that, in principle, satisfy Eqs. (2) and (3) for measured distances $d_m$ (or phases $\phi_m$). Preferably, the radio LD signal monitor should be spaced far apart from the plane defined by the locations of any three other radio LD signal sources 21, 23 and 25. This formalism can be used for radio LD signals and for outdoor LD signals. This formalism can also be used with the FM carrier or subcarrier signals replaced by AM carrier or subcarrier signals.

In one cycle of an FM subcarrier signal of frequency $f_m=f_{c,m}\pm 19$ kHz (m=21, 23, 25), an electromagnetic wave will move a distance equal to one wavelength $\lambda=c'/\omega_m$, or about 15.8 kilometers (km) in a vacuum. Thus, the distance of the FM subcarrier LD unit 13 from each FM signal source is known modulo 15.8 km. This distance ambiguity can be removed by initialization techniques. For example, if the region R within which the user 12 operates has a diameter that is <<15.8 km, the present location of the user can be determined at one location on the site R, with one set of FM signal source phases, and can be used for all locations on or adjacent to the site R by determining phase changes for each signal relative to this initial location. That is, the phase $\phi_m$ is initially determined at a time t=t0 for each FM or other location signal transmitter, using Eq. (2) or another suitable relation to determine the absolute or relative phases of the signals arriving from the signal source m at a known location, the initial location of the user 12 in the region R.

Assume that radio LD signal source number m (m=21, 23, 25) has known coordinates ($x_m$, $y_m$, $z_m$). From the determinable phase differences of the signals arriving from each radio LD signal source at a selected location with as-yet-undetermined coordinates (x,y,z) (such as the present location of the user 12), source number m is determined to lie at a distance $d_m$ from the selected location. Three radio LD signals, emitted from radio LD sources 21, 23 and 25 with synchronized phases, would arrive at the selected location (radio LD signal monitor) with measurable differences of phase $\phi_i$ and $\phi_k$ (i≠k; i, k=21, 23, 25) that are determined by $$t-d_i/c'-\phi_i/\omega_i=t-d_k/c'-\phi^k/\omega_i, (i\neq k;\ i,k=21, 23, 25) \quad (4)$$

which leads to the relation $$d_i-d_k=c'(\phi_k/\omega_k-\phi_i/\omega_i)=2\Delta_{ik}. \quad (5)$$

Equation (5) can be rewritten in the form $$uu_1+vv_1+ww_1-\Delta_{ij}=[(u-u_1)^2+(v-v_1)^2+(w-w_1)^2]^{1/2}, \quad (6)$$

$$u=x-(x_i+x_k)/2, \quad (7)$$

$$u_1=(x_i-x_k)/2, \quad (8)$$

$$v=y-(y_i+y_k)/2, \quad (9)$$

$$v_1=(y_i-y_k)/2, \quad (10)$$

$$w=z-(z_i+z_k)/2, \quad (11)$$

$$w_1=(z_i-z_k)/2. \quad (12)$$

Equation (6) defines a three-dimensional hyperboloid. The weighted phase differences $\Delta_{ik}$ (i≠k; i,k=21, 23, 25) define three intersecting hyperboloids or similar quadratic surfaces, each having two sheets. In general, the common intersections of each of these three groups of sheets should define a point or segment of a curve, where the two points (or curve segments) I1 and I2 shown in FIG. 1 are mirror images of each other with respect to the plane P(21,23,25) defined by the coordinates ($x_i,y_i,z_i$) of the three transmitters of the radio LD signals. The radio LD signal monitor, because it is displaced from and does not lie on the plane P(21,23,25), receives radio LD signals that have two distinct phase differences at the intersection points or segments I1 and I2. The radio LD signal monitor can thus distinguish between I1 and I2 and allow determination of the correct coordinates (x,y,z) for the selected location. This assumes that the phases of the three radio LD signals are synchronized, with zero phase differences or known phase differences between any two of these signals. In practice, each of the three radio LD signal sources will have a phase that may drift with time or change abruptly at particular times.

Where the three radio LD signals have different phases as issued at their respective sources, the source phase differences $\Delta\Phi_{ik}$ must be determined and removed before Eq. (6) can be used to determine the location coordinates (x,y,z) of the selected location. The radio LD signal monitor 32 (FIG. 1) receives the three radio LD signals and determines the phase differences $\Delta\Phi_{i,k}$ (i,k=1,2,3). The radio LD signal monitor 32 uses its knowledge of the separation distances between itself and the radio LD signal sources, plus the measured initial (and, optionally, subsequent) signal phase differences at the monitor. As noted above, the phase differences $\Delta\Phi_{i,k}$ may vary with time, through drift, abrupt change, or both. The radio LD signal monitor 32 then broadcasts the phase differences $\Delta\Phi_{i,k}$, preferably with a different carrier frequency than the radio LD signal frequencies. These phase differences are received and stored and/or processed by a phase information antenna and receiver 19 at the radio LD unit 13. The radio LD unit 13 also receives the radio LD signals (e.g., FM carrier or subcarrier signals) and determines the "raw" or uncompensated phase differences $\Delta\phi_{ik}$ at its location (i, k=21, 23, 25). A signal processor associated with this receiver then forms the "true" or compensated phase differences $$d_i - d_k = c'[(\phi_i - \Phi_i)/\omega_i - (\phi_k - 101_k)/\omega_k] = 2\Delta'_{ik}(i, k=21, 23, 25), \quad (13)$$

where only two of these equations are independent. This compensates for non-synchronization and possible drifting of the radio LD signals transmitted by the radio LD signal sources.

Use of a stationary FM signal monitor with fixed and known location, which does not otherwise participate in determination of the selected location coordinates (x,y,z), to determine the phase differences $\Delta\phi_{ik}$ (i,k=21, 23, 25) is disclosed in U.S. Pat. No. 5,173,710 issued to Kelley et al, discussed above and incorporated herein by reference. The FM source phase differences $\Delta\Phi_{ik}$ can be measured using a digital phase-locked-loop at the additional FM receiver/transmitter, as disclosed in FIGS. 4–11 and the accompanying text in the Kelley et al patent.

In the subject invention, the radio LD signal monitor 32 is mobile, not stationary, and this monitor determines its own location in order to determine the relative phases. The location coordinates (x,y,z) of the radio LD unit 13 carried by or attached to the user 12 are now known.

The central station 29 can serve as a reference station with accurately known location for differential position computations for determining the present location of the outdoor LD signal antenna (33 in FIG. 1 and 53 in FIG. 4) or of the radio LD signal antenna (15 in FIGS. 1 and 4). Differential position techniques use the known location of the reference station to remove some of the errors contained in signals received by a mobile station, such as the user 12, that is located within a few tens of kilometers from the reference station. Differential GPS techniques are discussed in Tom Logsdon, *The NAVSTAR Global Positioning System*, Van Nostrand Reinhold, 1992, pp. 76–90, and differential Loran techniques are discused in U.S. Pat. No. 5,045,861, issued to Duffet-Smith, both of which are incorporated by reference herein. Thus, the radio LD signal monitor 32 can include an outdoor LD signal antenna 33 and associated outdoor LD signal receiver/processor, to receive the outdoor LD signals and to determine any location error values contained in these signals by comparison of the calculated location with the known location of the reference station. The radio LD signal monitor 32 in FIG. 1 can also include a transmitter to transmit these error values to a receiver/processor at the outdoor LD signal unit (31 in FIG. 1 and 51 in FIG. 3) so that the calculated present location of the outdoor LD signal antenna can be adjusted by removal of outdoor LD signal errors that have been determined from the signals received at the radio LD signal monitor 32. Compensation for outdoor LD signal errors can be provided at the central station 29 or at the outdoor LD unit (31,51).

Figure 6:
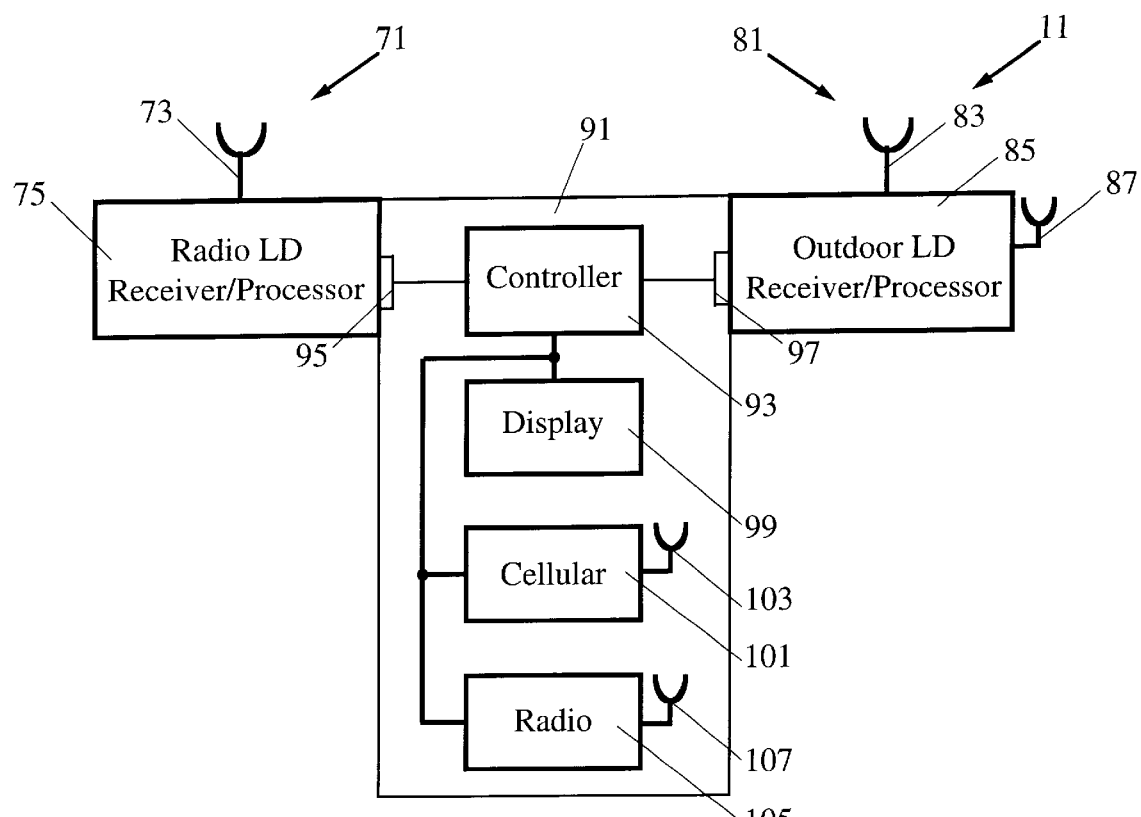
FIGS. 6 and 7 are schematic views of an LD unit according to two embodiments.

FIG. 6 illustrates one embodiment of a hybrid LD unit 11 constructed according to the invention. The hybrid LD unit 11 includes a radio LD unit 71, an outdoor LD unit 81 and an controller-interface unit 91. The radio LD unit 71 includes a radio LD signal antenna 73, and a radio LD signal receiver/processor 75 associated with and connected to the LD signal antenna 73. The radio LD signal antenna 73 receives the radio LD signals from the LD signal sources 21, 23 and 25 shown in FIG. 1, compares the signal strength, signal quality or other suitable signal indicium $I_{rad}$ with a threshold indicium $I_{rad,thr}$, and passes these signals to the radio LD signal receiver/processor 75 for signal analysis and/or processing. The radio LD signal receiver/processor 75 uses the relative phase information it receives in Eq. (6) or (13) or in similar equations and estimates the location of the radio LD signal antenna 73, preferably based upon common intersections of hyperbolic surfaces.

The outdoor LD unit 81 includes an FM subcarrier signal antenna 83, an outdoor signal receiver/processor 85 associated with and connected to the outdoor antenna 83, and a phase information antenna 87. The phase information antenna and receiver 87 receives the radio LD signals from the radio LD signal sources and passes these signals to the outdoor LD signal receiver/processor 85 for determination of the relative phases of the radio LD signal sources. This relative phase information is then passed to the radio LD unit 71 through the controller interface 91. The outdoor antenna 83 receives the outdoor signals from the outdoor LD signal sources, compares the signal strength, signal quality or other suitable signal indicium $I_{out}$ with a threshold indicium $I_{out,thr}$, and passes these signals to the outdoor LD signal receiver/processor 85 for LD signal analysis and/or processing, preferably based on common intersections of hyperbolic surfaces.

The interface-controller unit 91 includes a controller module 93, an interface 95 between the radio LD signal receiver/processor 75 and the controller, an interface 97 between the outdoor LD receiver/processor 85 and the controller, and an optional visual or audible display unit 99. The controller 93 receives the present location coordinates $(x_u, y_u, z_u)_{rad}$ of the user 12 from the radio LD signal receiver/processor 75, receives the present location coordinates $(x_u, y_u, z_u)_{out}$ of the user 12 from the outdoor LD signal receiver/processor 85, and receives the indicia $I_{rad}$ and $I_{out}$, for comparison with the respective indicia thresholds $I_{rad,thr}$ and $I_{out,thr}$. The interface unit 91 optionally includes an input/output port that allows communication with another transmitter or receiver (not shown).

In one embodiment, the I/O port includes a cellular communication means 101 with associated cellular antenna 103 for communicating with another person or facility by cellular telecommunications, the cellular means being connected to the controller module 93. At one or more selected times, or upon receipt by the controller module 93 of a command by radiowave signals or telecommunication signals, the controller module causes the cellular communication means 101 to send information on the present or recent location of the LD unit 11 to a person or facility spaced apart from this LD unit.

In another embodiment, the I/O port includes a radiowave communication means 105 and associated radio antenna 107, connected to the controller 93, for communicating with another person or facility by radio at frequencies such as 88–108 MHz in a manner similar to the manner used for communicating by the cellular means 101.

If $I_{rad} \geq I_{rad,thr}$ and $I_{out} \geq I_{out,thr}$, the controller module 93 is free to choose the coordinates $(x_u, y_u, z_u)_{rad}$ or the coordinates $(x_u, y_u, z_u)_{out}$ as the present location of the user 12. Differences in accuracy between these two determinations of present location would lead the controller to choose one of these triples as the coordinates of the user's present location. For example, if the outdoor LD system is GPS or GLONASS or another system whose inaccuracies are much lower than the inaccuracies of a radio LD system such as the FM subcarrier system, the controller module 93 would probably choose $(x_u, y_u, z_u)_{out}$ as the present location coordinates of the user 12. If $I_{rad} \geq I_{rad,thr}$ and $I_{out} < I_{out,thr}$, the controller chooses the coordinates $(x_u, y_u, z_u)_{rad}$ as the present location coordinates of the user. If $I_{rad} < I_{rad,thr}$ and $I_{out} \geq I_{out,thr}$, the controller module 93 chooses the coordinates $(x_u, y_u, z_u)_{out}$ as the present location coordinates of the user. If $I_{rad} < I_{rad,thr}$ and $I_{out} < I_{out,thr}$, the controller module 93 chooses neither set of coordinates as the present location coordinates of the user, and the controller module notifies any interested person or facility that the methods used for location determination have an unacceptably high errors associated with them and should not be used, or should be used with caution. One or both of the threshold indicia $I_{rad,thr}$ and $I_{out,thr}$ can be allowed to vary with the situation, rather than being fixed for all time.

One possible choice of the indicia $I_{rad}$ and $I_{out}$ is signal strength received by the LD unit 11. Because the radio LD signals and the outdoor LD signals are processed by different receiver/processors 75 and 85 (FIG. 4), a given signal strength $S_{rad}$ for the radio LD signal unit 71 may produce approximately the same location accuracy as a given (possibly different) signal strength $S_{out}=f(S_{rad})$ for the outdoor LD signal unit 81, where f is a monotonically increasing function of the variable shown, $S_{rad}$. The function f may be approximable by an analytic function, such as a truncated power series in the variable $S_{rad}$, namely $$f(S) = \sum_{k=0}^{P} a_k S^{k+K0}, \quad (14)$$

where P is a non-negative integer, K0 is a real number and the coefficients $a_k$ are also real. One possible choice for this function is $$f(S)=a_0 S^{K0} (K0 \neq 0), \quad (15)$$

which allows a simple correspondence between $S_{rad}$ and $S_{out}$ to be made and used. Assuming that $S_{rad} \geq S_{rad,thr}$ and $S_{out} \geq S_{out,thr}$, where $S_{rad,thr}$ and $S_{out,thr}$ are threshold values of the respective signal strengths, below which the location inaccuracies are unacceptable, an indicium ratio can be defined by the relations $$u=I_{out}/I_{rad}=S_{out}/S_{rad}, \quad (16)$$

$$v=f(S_{rad})/S_{rad}=g(S_{rad}), \quad (17)$$

where g is another function, defined by Eq. (17). The radio LD antenna location is selected by the controller if u<v, the outdoor LD antenna location is selected by the controller if u>v, and other criteria are used by the controller to select which unit will supply the user location if u=v. If $S_{rad}<S_{rad,thr}$ and $S_{out} \geq S_{out,thr}$, the controller selects the antenna location provided by the outdoor LD system. If $S_{rad} \geq S_{rad,thr}$ and $S_{out} \geq S_{out,thr}$, the controller selects the antenna location provided by the radio LD system. If $S_{rad}<S_{rad,thr}$ and $S_{out}<S_{out,thr}$, the controller selects neither system and notifies the user that each of the radio LD system location and the outdoor LD system location has unacceptable inaccuracy to be used.

Another possible choice for each of the indicia is $$I_{rad}=(S_{rad}/S_{rad,thr})^{K1}(S_{rad} \geq S_{rad,thr})=0(S_{rad}<S_{rad,thr}), \quad (18)$$

$$I_{out}=(S_{out}/S_{out,thr})^{K2}(S_{out} \geq S_{out,thr})=0(S_{out}<S_{out,thr}), \quad (19)$$

where $S_{rad,thr}$ and $S_{out,thr}$ are threshold values of the respective signal strengths, below which no accurate determination of antenna location can be made, and K1 and K2 are positive constants. One now forms the ratio $$r=I_{out}/I_{rad}. \quad (20)$$

The controller selects the radio LD system location if r<1 and selects the outdoor LD system location if r>1.

A signal quality parameter, such as the instantaneous signal-to-noise ratio SNR, for an incoming signal can be used in place of a signal robustness parameter such as signal strength S. The parameters $SNR_{rad}$ and $SNR_{out}$ can be substituted for the respective signal strength parameters $S_{rad}$ and $S_{out}$ in Eqs. (14)–(20), and the indicia $I_{rad}$ and $I_{out}$ can be redefined in terms of these SNR parameters.

The indicium may be defined for the radio LD unit or for the outdoor LD unit as a whole. Where signal strength S is the parameter of interest, the signal strength of the unit as a whole may be defined as follows. Let $S_1, S_2, \ldots, S_Q$ be the measured signal strength values ($\geq 0$) from each of the (radio LD or outdoor LD) signals, where this set of sources is the minimal set for which that LD unit can determine the location of that unit's antenna. The signal strength $S^\wedge$ for that radio LD unit or that outdoor LD unit may be defined as a minimum $$S^\wedge=\min \{S_1, S_2, \ldots, S_Q\}. \quad (21)$$

An alternative choice for the signal strength $S^\wedge$ is a weighted average $$S^\wedge = \sum_{q=1}^{Q} a_q S_q \Big/ \sum_{q=1}^{Q} a_q, \quad (22)$$

for that LD unit, where the weighting coefficients $a_q$ are non-negative, with at least one coefficient positive, and may be uniform-valued or non-uniform-values. The weighting coefficients $a_q$ may be chosen and fixed initially, or these coefficients may be determined dynamically by that LD unit, assigning larger positive weights to the coefficients that correspond to LD signal sources that are more important in the determination of location of that unit's antenna. Another alternative choice is the uniformly weighted arithmetic average $$S^\wedge = \sum_{q=1}^{Q} S_q / Q \quad (23)$$

Another alternative choice is a weighted geometric or product average $$S^\wedge = \left[ \prod_{q=1}^{Q} S_q^{p(q)} \right]^{1/P}, \quad (24)$$

$$P = \sum_{q=1}^{Q} p(q) \quad (p(q) \geq 0; \text{at least one coefficient positive}), \quad (25)$$

which includes the uniformly weighted geometric average with p(q)=1/Q.

The preceding choices compare the indicium for each LD unit with each other to determine which LD unit (radio LD unit or outdoor LD unit) will be used for the estimate of location of the user. As an alternative to this approach, the indicia for each FM signal source and for each outdoor LD signal source can be determined and ranked in a single interleaved list, ordered by the magnitude of each indicium. For example, if the indicia for the radio LD signals are designated as $S_1$(rad), $S_2$(rad), $S_3$(rad) and the indicia for the outdoor LD signals are designated as $S_1$(out), $S_2$(out), $S_3$(out), $S_4$(out), the ranking at a particular moment might be $$r_1(\text{out}) \leq r_2(\text{out}) \leq r_1(\text{rad}) \leq r_3(\text{out}) \leq r_2(\text{rad}) \leq r_3(\text{rad}) \leq r_4(\text{out}). \quad (26)$$

$$r_j(\text{rad})=S_j(\text{rad})/S_{rad,thr}, \quad (27)$$

$$r_j(\text{out})=S_j(\text{out})/S_{out,thr}, \quad (28)$$

where $S_{out,thr}$ and $S_{out,thr}$ are the threshold values of the indicia for the radio LD and outdoor LD units, respectively. In this alternative, the controller receives LD signals (seven such signals in the example shown in Eq. (26) ), determines the indicium for each LD signal, ranks these signals, and chooses a subset of J signals with the greatest indicia to estimate the present location of the user, where J is a selected positive integer. If J=4 and the example shown in Eq. (26) is used, the signals from outdoor LD sources no. 3 and 4 and the signals from radio LD sources 2 and 3 would be selected. If two or more LD signals have the same indicium value and at least one of these signals is part of the J signals with the highest indicia, the subset of signals with the J largest indicia can be extended to include a larger subset of J' ($\geq$J) of signals including all or a selected subset of these signals with equal indicia, if desired. The indicium ratios $r_j$(rad or out) can be replaced by indicium differences $S_j(\text{rad})-S_{rad,thr}$ and $S_j(\text{out})-S_{out,thr}$ in the ranking process above, if commensurate indicia are used.

In this alternative, the controller uses a hybrid location determination model that accepts LD signals from a single type of LD source or from two types of LD sources and provides an estimate of the present location of the user from these signals. Each signal indicium is compared with a corresponding threshold indicium value $S_{thr}$, and if the indicium is not at least as large as this threshold value the signal corresponding to this indicium is not included in the candidate set of signals to be used to estimate the present location of the user. If the number of signals in the candidate set is less than the minimum number J of signals needed to accurately estimate the present location of the user, the system notifies the user or another person or facility that the user's present location cannot be determined from the presently available data. Because a larger number of signals is being provided, drawn from the radio LD sources and from the outdoor LD sources, it is more likely that at least J such signals can be found with indicia values above the corresponding indicia thresholds $S_{rad,thr}$ and $S_{out,thr}$.

Where signals from radio LD sources and from one or more outdoor LD sources are blended, Kalman filtering can be used to provide optimal blending of these signals in several well known manners. Use of Kalman filtering for such purposes is discussed by R. G. Brown in *Introduction To Random Signal Analysis And Kalman Filtering*, Wiley & Sons, 1983, pp. 181–272, the information from which is incorporated by reference herein.

Figure 7:
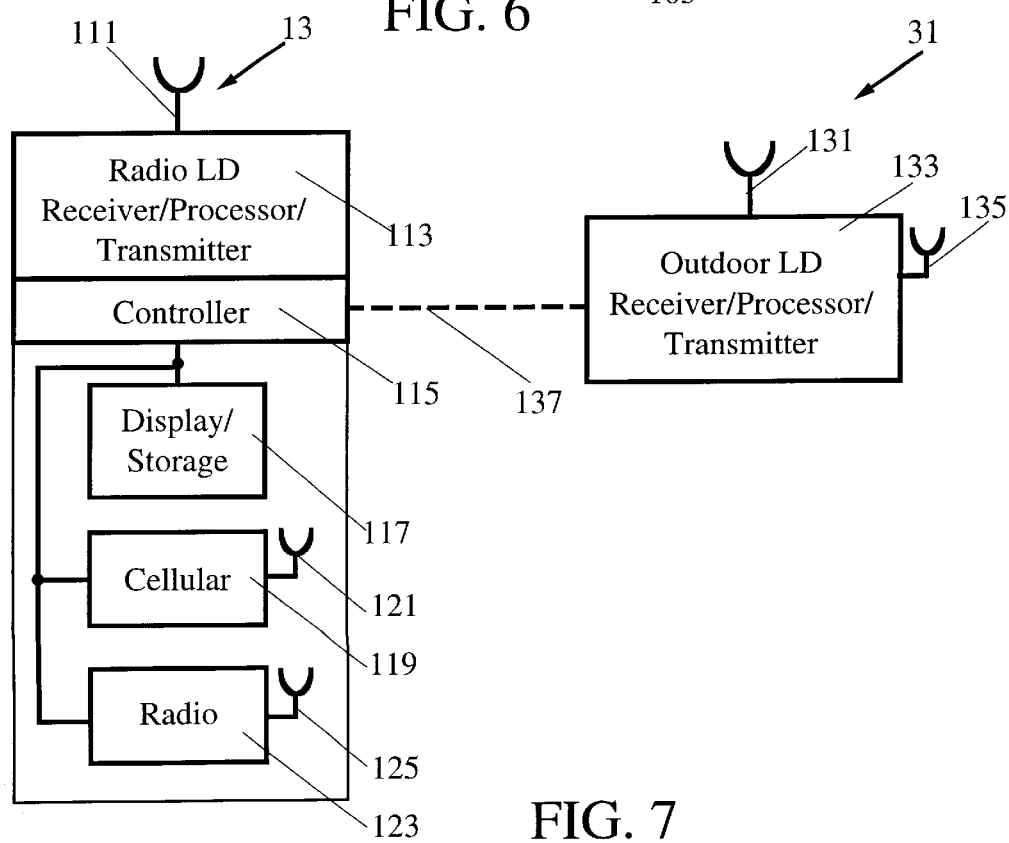

FIG. 7 is similar to FIG. 6, except that the radio LD unit 13 and the outdoor LD unit 31 (or 51) are now physically separated from, and move independently of, each other. The radio LD unit 11 is portable and moves with the user 12. The outdoor LD unit 31 includes an outdoor LD signal antenna 101 that receives outdoor LD signals and passes these signals to an outdoor LD signal receiver/processor/ transmitter 103. The outdoor LD receiver/processor/ transmitter 103 analyzes these outdoor LD signals and (1) estimates a location of the outdoor LD antenna 101, (2) determines one or more signal indicia $I_{out}$ representing signal quality and/or signal robustness for these incoming signals and (3) passes this information to a signal transmitter that is also part of the outdoor LD receiver/processor/ transmitter. A radio LD signal antenna 105 receives the radio LD signals transmitted by the radio LD signal sources 21, 23 and 25 (FIG. 1) and passes these signals to the LD receiver/ processor/transmitter 103, where the relative phases of the received radio LD signals are determined from a knowledge of the fixed locations of these sources and a knowledge of the location of the outdoor LD signal antenna 101. Equation (6) or (13) is used to determine the relative phases of the radio LD signals, where the coordinate triples (u,v,w) and ($u_1,v_1,w_1$) are now known.

The outdoor LD unit 31 also determines the phases $\phi_m$ (m=21, 23, 25) of the radio LD signals, "as received" at outdoor LD unit, and transmits this information to the radio LD unit 13. The radio LD unit optionally compares the "as received" phases at the radio LD unit 13 with the "as received" phases at the outdoor LD unit 31 and determines the displacement coordinates of the radio LD unit relative to the outdoor LD unit, using Eq. (6) or Eq. (13). Adding the location coordinates of the outdoor LD unit 31 to the displacement coordinates of the radio LD unit 13 relative to the outdoor LD unit produces another estimate ($x'_{rad}, y'_{rad}, z'_{rad}$) of the location coordinates of the radio LD unit. The radio LD unit 13 then compares the signal quality or robustness parameters $I_{out}$ and $I_{rad}$ for the outdoor LD unit and the radio LD unit, respectively, and determines which estimate of location coordinates will be used for the radio LD unit 13. Thus, whether the radio LD unit and the outdoor LD unit are attached together or move separately and independently, two estimates for the location coordinates of the radio LD unit are available.

The estimated location of the outdoor LD antenna 101, the outdoor LD signal parameter(s) $I_{out}$, and the relative phases of the radio LD signals are transmitted by a communications link 107 to a controller 115 in the radio LD unit 13 for further processing. The communications link 107 can be provided by a cable or wire or by a wireless link, as desired.

A radio LD antenna 111 in the radio LD unit 13 receives radio LD signals from the radio LD signal sources 21, 23 and 25 and passes these signals to a radio LD signal receiver/ processor 113. The radio LD receiver/processor 113 also receives the information transmitted by the outdoor LD receiver/processor/transmitter 103 and (1) estimates the location of the radio LD signal antenna 111, (2) determines one or more signal quality or robustness indicia $I^{rad}$ for the radio LD signals, and (3) passes this information to the controller 115. The controller 115 (1) compares the signals indicia $I_{out}$ and $I_{rad}$ with each other and (2) determines whether the outdoor LD signals or the radio LD signals or neither group of signals should be used to determine the present location of the radio LD unit 13, from a comparison of the indicia $I_{rad}$ and $I_{out}$ of these groups of LD signals with each other and with certain threshold indicia $I_{rad,thr}$ and $I_{out,thr}$. Recall that the radio LD unit is carried or transported by or attached to the user 12. The controller 115 selects the appropriate group of LD signals (radio LD or outdoor LD) for determination of the present location of the user 12 or rejects both groups of signals as inadequate, based in part on the parameters $I_{rad}$ and $I_{out}$.

For any location determination unit (FM subcarrier, GPS, Loran, etc.) or combination of such units, the measured pseudorange, based on measurements at time t0, for times t>t0, can be expressed as $$PR(t;t0;ij) = R_{ij} + \phi_{rcvr,i} - \phi_{source,j} + \partial T_{ij} + \partial I_{ij} + \partial e, \quad (29)$$

$R_{ij}$=actual range from receiver no. $i$ to signal source no. $j$, (30)

$\phi_{rcvr,i}/c$=clock offset from source time for receiver $i$, (31)

$\phi_{source,j}/c$=clock offset from source time for source $j$, (32)

$\partial T_{i,j}/c$=signal propagation time delay in troposphere, (33)

$\partial I_{i,j}/c$=signal propagation time delay in ionosphere, (34)

$\partial e$=residual measurement errors, including multipath error, (35)

$c$=propagation velocity of light. (36)

Where the signal source (j) is a ground-based signal source, the ionospheric time delay $\partial I_{i,j}$ will be zero, but the tropospheric time delay $\partial T_{i,j}$ may be non-zero. For a satellite-based signal source, such as GPS or GLONASS, the ionospheric and tropospheric time delays may both be non-zero. The ionospheric and tropospheric time delay terms may be combined into a single atmospheric time delay term $\partial a_{i,j}$.

One suitable set of equations that the system can seek to comply with is $$\|C_i - x_j\| = PR(t; t0; i; j) - b_i,  \quad (37)$$

$C_i$ = estimate of three-dimensional coordinates of receiver no. $i$, (38)

$X_j$ = known three-dimensional coordinates of signal source no. $j$, (39)

$PR(t; t0; i; j)$ = measured pseudorange from signal source no. $j$ to signal receiver no. $i$ (user), (40)

$b_i/c$ = clock offset for receiver no. $i$, (41)

where the unknown offset coefficients $b_i$ are often the parameters to be determined.

Equation (37) can be used to determine the parameters $b_i$ by minimization of mean square error of the errors inherent in Eq. (24), using the error quantity $$\varepsilon(b_1, b_2, \ldots, b_L) = \sum_{i=1}^{L}\sum_{j=1}^{J'}(\|C_i - x_j\| - PR(t; t0; i; j) + b_i)^2 / \sigma_{ij}^2, \quad (42)$$

where L is the number of receivers at the user location and $\sigma_{ij}^2$ is the statistical variance associated with signals received from source number j by the receiver number i. The error quantity $\epsilon(b_1, b_2, \ldots, b_L)$ is minimized with respect to choice of the clock offset parameters bi in Eq. (42). If the statistical variances $\sigma_{ij}^2$ do not depend on the receiver numbers i ($\sigma_{ij}^2 = \sigma_j^2$), the sum over the index i in Eq. (42) can be deleted and the individual error terms $$\varepsilon_i(b_i) = \sum_{j=1}^{J'}(\|C_i - x_j\| - PR(t; t0; i; j) + b_i)^2 / \sigma_j^2 \quad (43)$$

can be minimized with respect to choice of the clock offset parameters $b_i$.

The number J' of signal sources summed over in Eq. (42) may be larger than the minimum number J needed for location determination and may depend upon the particular receiver (i) that receives these signals. If the sum in Eq. (42) or Eq. (43) is restricted to the minimum number J, each set of J terms will yield an error $\epsilon$ or $\epsilon_i$, and the magnitudes of these errors may vary greatly with the choice of the minimum set of signal sources. Preferably, where the number J' of available signal sources exceeds the minimum number J, only those signal source sets for which the error $\epsilon$ or $\epsilon_i$ is less than a selected number should be used to determine the present location of the user; the number in such a signal source set may be equal to J or be greater than J (J'>J).

Where J' exceeds J, the redundancy present can be used to evaluate the integrity of the LD system. One method of evaluating system integrity is set forth by Mark Sturza, in "Navigation System Integrity Monitoring Using Redundant Measurements", Navigation, vol. 35 (1988–1989) pp. 483–501, incorporated by reference herein. The Sturza approach divides the measurement space (of dimension J') into a smaller space of dimension J, representing the state vectors required for determination of the location, and a "parity space" of dimension J'–J, then develops measures of system integrity based on this decomposition.

The radio LD signals indicated in FIGS. 1, 3, 4 and 5 may be used outside as well as inside a building or other structure to allow determination of the present location of the user 12. Alternatively, radio LD signals may be used for inside-the-building location reporting and may be supplemented for outside-the-building location reporting by supplemental signal sources. As noted above, one suitable outdoor LD signal system is a Global Positioning System (GPS) or Global Navigation Orbiting Satellite System (GLONASS) or similar satellite-based location determination system (collectively referred to as GPS herein). A Global Positioning System is discussed in detail in Tom Logsdon, *The NAVSTAR Global Positioning System*, Van Nostrand Reinhold, 1992, pp. 17–90, which is incorporated by reference herein. Use of the GPS and GLONASS signals is also discussed in detail below.

Because the GPS and other outdoor LD signals use a high frequency carrier (of the order of 1 GHz), these signals may be severely attenuated and/or distorted if such signals are received inside a building or other structure that is partly or fully electromagnetically insulating. For this reason, a GPS or other outdoor LD system may be unsuitable for determination of the present location of an outdoor antenna that is positioned 5 within such a building or similar structure. However, the combined use of radio LD signals for location determination inside a building or similar structure (e.g., a deep shaft mine or tunnel under or through the Earth) plus outdoor LD signals for location determination outside a building or similar structure can provide a satisfactory LD system in most urban and non-urban communities.

Alternatively, the GPS or GLONASS signals may be replaced by Loran-C signals produced by three or more Loran signal sources positioned at fixed, known locations, for outside-the-building location determination. A Loran-C system relies upon a plurality of ground-based signal towers (57, 58, 59 in FIGS. 4 and 5), preferably spaced apart 100–300 km, that transmit distinguishable electromagnetic signals that are received and processed by a Loran signal antenna 53 and Loran signal receiver/processor 55. A representative Loran-C system is discussed in *Loran-C User Handbook*, Department of Transportation, U.S. Coast Guard, Commandant Instruction M16562.3, May 1990, which is incorporated by reference herein. Loran-C signals use carrier frequencies of the order of 100 kHz and have maximum reception distances of the order of hundreds of kilometers. The combined use of FM signals for location determination inside a building or similar structure plus Loran-C signals for location determination outside a building or similar structure can also provide a satisfactory LD system in most urban and suburban communities.

Other ground-based radiowave signal systems that are suitable for use as part of an LD system include Omega, Decca, Tacan, JTIDS Relnav (U.S.

Air Force Joint Tactical Information Distribution System) and PLRS (U.S. Army Position Location and Reporting System) and are summarized by Logsdon, op. cit., pp. 6–7 and 35–40, incorporated by reference herein.

Other radiowave signals, such as emergency band signals in the frequency ranges such as 12.23–13.2 MHz, with suitable signal timing and a signal indicium included therein, can be used as a source of LD signals for outdoors locations. For convenient reference, a satellite-based or ground-based location determination system that can be used to determine the location of an LD unit 11 over relatively long distances (50 km or more) outside a building or other structure over the region R is referred to herein as an "outdoor LD system".

Figure 8:
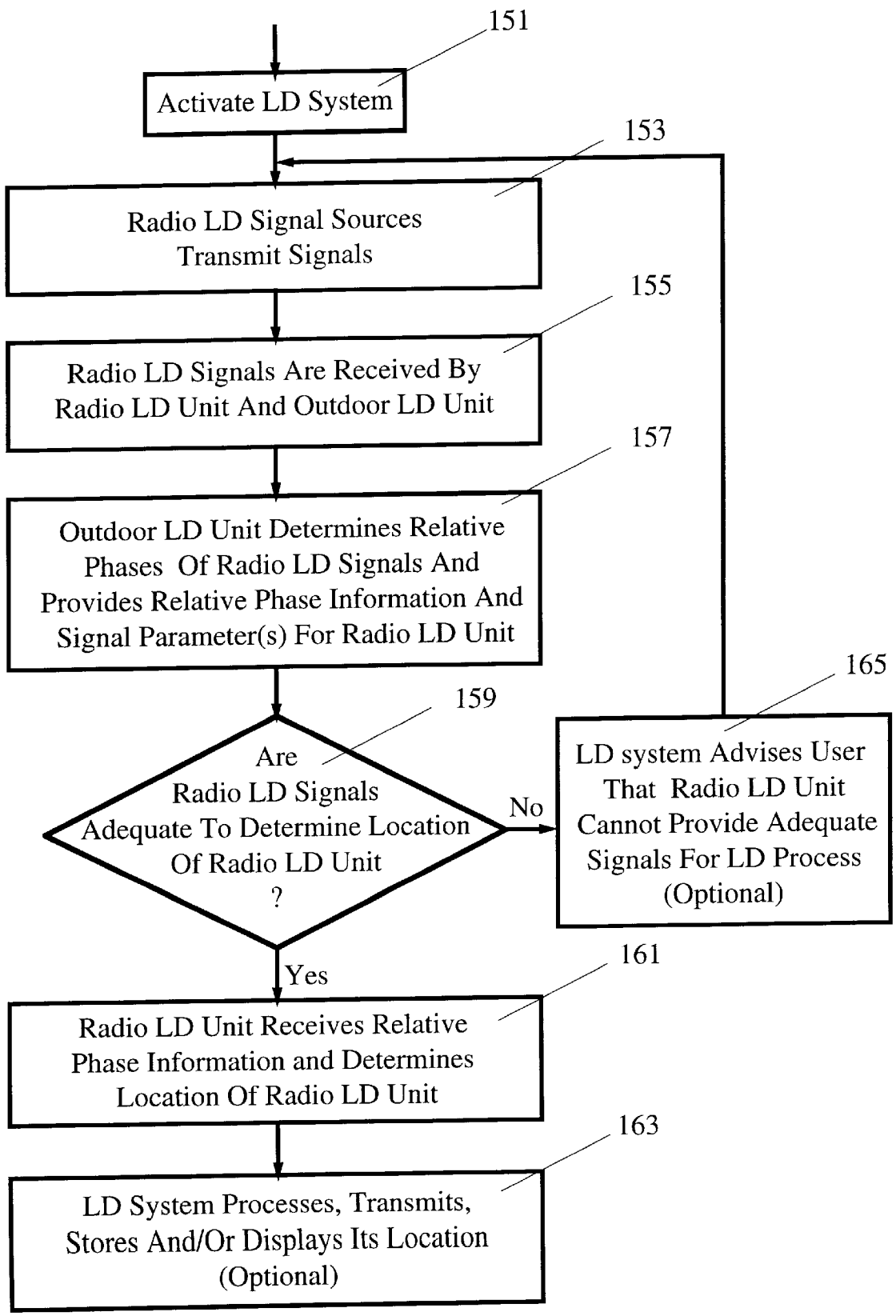
FIGS. 8 and 9 are flow charts of suitable procedures for location determination using only radio LD signals, and using radio LD signals and outdoor LD signals, respectively.

FIG. 8 is a flow chart of a procedure that can be used to determine the present location of the hybrid LD unit 11, if only a radio LD unit, such as an FM subcarrier system, is used in combination for all location determinations inside and outside buildings and other structures in a region R. In step 151, the hybrid LD system 11 is activated and made ready to determine the present location of an LD unit. In step 153, the radio LD signal and outdoor LD signal sources transmit LD signals, which are received by the radio LD units and the outdoor LD units in step 155. In step 157, the outdoor LD unit (1) estimates its own present location, (2) determines the relative phases of the radio LD signals, and (3) provides this information for use by a controller associated with the radio LD unit. In step 159, the controller determines whether the radio LD signals are adequate to allow determination of the location of the radio LD unit antenna, relying in part on indicia associated with those signals. If the radio LD signals are adequate, the radio LD unit determines the present location of the radio LD unit or of the user 12. Optionally, the hybrid LD system 11 then processes the radio LD signals further, or transmits or stores or displays the location of the user 12, in step 163. If the hybrid LD system determines, in step 159, that the radio LD signals are not adequate to provide the location of the hybrid system, the system recycles and seeks new incoming radio LD signals for this determination and optionally advises the user that the radio LD unit cannot provide adequate signals for determination of the location of the hybrid LD system, in step 165.

Figure 9:
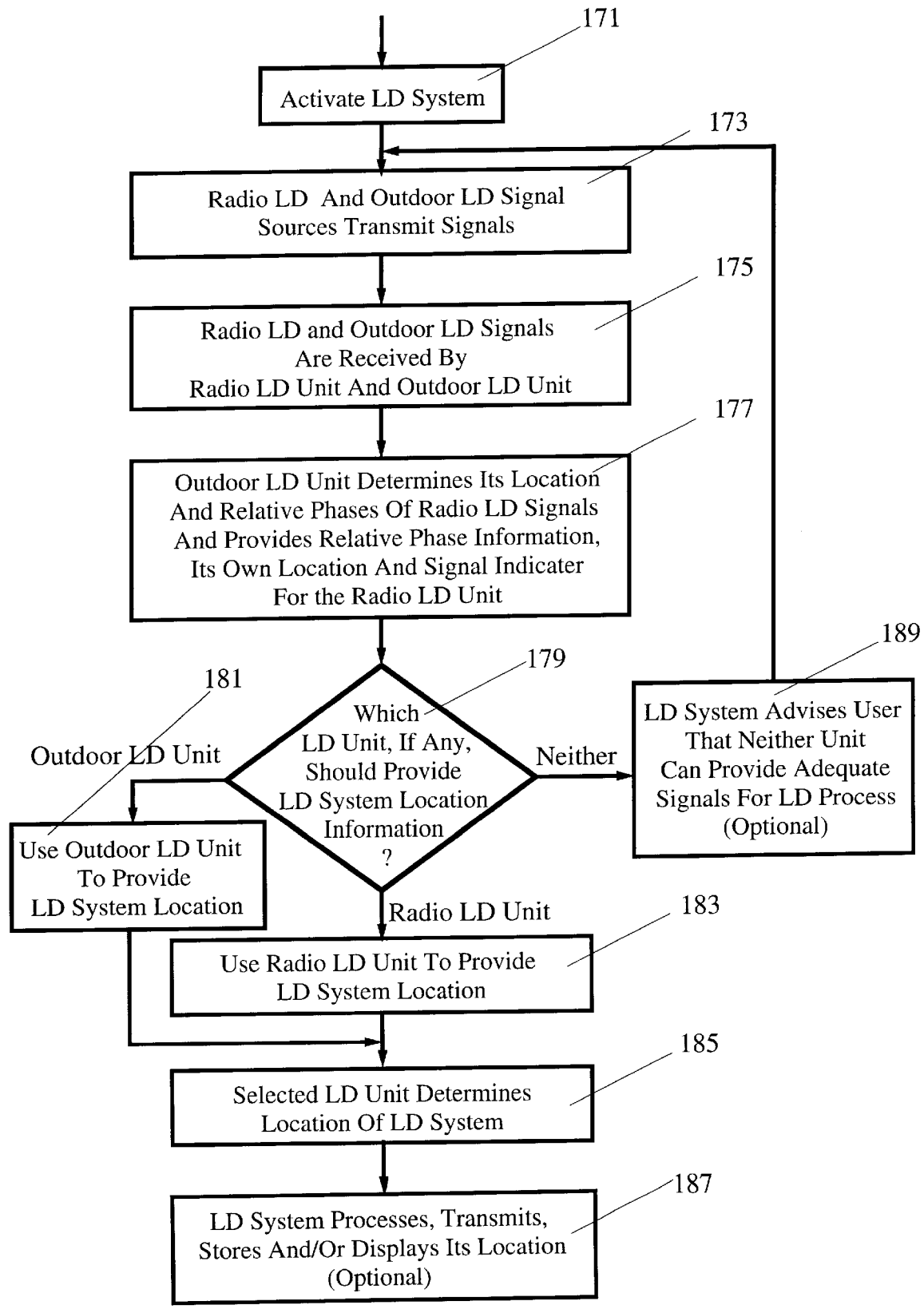

FIG. 9 is a flow chart of a procedure that can be used to determine the present location of the hybrid LD unit 11, if a radio LD unit, such as an FM subcarrier system, and an outdoor LD unit, such as a GPS, are used in combination for all location determinations inside and outside buildings and other structures in a region R. In step 171, the hybrid LD system 11 is activated and made ready to determine the present location of an LD unit. In step 173, the radio LD signal and outdoor LD signal sources transmit LD signals, which are received by the radio LD units and the outdoor LD units in step 175. In step 177, the outdoor LD unit (1) estimates its own present location, (2) determines the relative phases of the radio LD signals, (3) determines one or more signal quality or signal robustness indicia $I_{out}$ for the outdoor LD signals received, and (4) provides this information for use by a controller associated with the radio LD unit. In step 179, the controller determines whether the outdoor LD signals, or the radio LD signals, or both, or neither, is adequate to allow determination of the location of the associated LD unit antenna, relying in part on the indicium or indicia associated with that signal or signals. If the outdoor LD signals are adequate and the outdoor LD unit is selected, in step 181, to determine the location, the system (or controller) uses the outdoor LD unit information to determine the present location of the user. If the radio LD signals are adequate and the radio LD unit is selected, in step 183, to determine the location, the system (or controller) uses the radio LD unit information to determine the present location of the user. In step 185, the controller uses the selected LD signals to determine the location of the hybrid LD system 11, or of the radio LD unit, and thus of the user 12. Optionally, the hybrid LD system 11 then processes the LD signals further, or transmits or stores or displays the location of the hybrid LD system, in step 187. If the hybrid LD system determines, in step 179, that neither the radio LD signals nor the outdoor LD signals is adequate to provide the location of the hybrid system, the system recycles and seeks new incoming radio LD signals and outdoor LD signals for this determination and optionally advises the user that neither LD unit can provide adequate signals for determination of the location of the hybrid LD system, in step 189.

If a given LD unit is specified in the interrogation signal, that LD unit automatically determines, in step 179 of FIG. 9, whether the LD information should be provided by the outdoor LD unit, by the FM subcarrier unit, or by neither, based upon the present location of that LD unit and/or one or more indicia for each radio LD signal and for each outdoor LD signal that indicates which of the two signals is likely to provide the most accurate location under the circumstances. An indicium for each signal preferably is a measure of the signal robustness, such as signal strength, or the signal quality, such as signal-to-noise ratio. Use of such indicia are discussed above. In some circumstances, neither the radio LD signals nor the outdoor LD signals may provide acceptable signals for location determination, and the LD unit optionally advises the user of this circumstance.

If the LD unit is located outside of and away from all buildings and structures, the LD unit can use the outdoor LD unit to provide LD information on its present location, or can use the radio LD unit for this purpose. If the LD unit is located inside a building or other structure or in another location that is inaccessible to outdoor LD system signals, the radio LD unit provides present location information for the LD unit, as in step 183 in FIG. 9.

Optionally, the controller or the hybrid LD system 11 can transmit all the radio LD signal information and all the outdoor LD signal information, unprocessed, partly processed or fully processed, to a central processing station, preferably including a label, tag or other indicium that identifies the transmitting LD unit. The central station then evaluates the adequacy of the signals and, if possible, determines the present location of the user 12. Optionally, the controller or the hybrid LD system 11 can transmit the LD signal information to the central station at an arbitrary time or in one or more allocated time slots (each of length 10–200 msec) for this response. Optionally, the central station then processes, stores and/or visually or audibly displays the present location of the user.

When the radio LD unit 13 is activated, the relative phases of the radio LD signals must be initialized and the carrier or sub-carrier bias corrected, preferably using the relative phase information obtained by the outdoor LD unit 31 in FIG. 1, 3, 4 or 5. If the outdoor LD unit 31 is also activated at this time, the location that the outdoor LD unit senses for itself may not be very accurate for an initial outdoor LD signal acquisition interval; and inaccuracies in the outdoor LD unit location coordinates will produce corresponding inaccuracies in the calculated relative phases of the radio LD signals. The outdoor LD unit location coordinates will have an estimated overall inaccuracy given by $\epsilon_{out}(t)=\text{PDOP}(t) \cdot \text{PR}(t)$, where PDOP(t) is the (dimensionless) position dilution of precision, based on the current geometrical configuration defined by the outdoor LD signal sources used to determine the outdoor LD unit location.

If the outdoor LD signal sources are stationary, such as fixed ground-based sources, The PDOP parameter will be approximately constant and will not vary appreciably with time. If one or more of the outdoor LD signal sources is satellite-based, the PDOP parameter will vary with time in a predictable manner as long as the same outdoor LD signal sources provide the outdoor LD signals. The calculated location coordinates of the outdoor LD unit may be ignored or not accepted until a standard deviation $\sigma_{\epsilon,out}(t)$ associated with the error variable $\epsilon_{out}(t)$ falls below a selected threshold $\epsilon_{out,thr}$. However, the inequality $\epsilon_{out}(t) \leq \epsilon_{out,thr}$ may not be satisfied for a time interval of substantial length, such as $\tau(thr)=60-180$ sec.

One alternative here is to activate the radio LD unit 13 but not begin the calculation of radio LD unit location (or of outdoor LD unit location) until the outdoor LD unit has acquired a location fix with reasonable estimated accuracy: $\epsilon_{out}(t) \leq \epsilon^{out,thr}$.

Another alternative is to use a linear predictor, based on least mean squares analysis or another suitable statistical approach, to predict the "stable" location coordinates for the outdoor LD unit. This approach may sharply reduce the time required to achieve "stable" values for these coordinates and to begin providing radio LD signal relative phase information for the radio LDS unit.

The radio LD signal sources are generally located at fixed positions with elevations no higher than about 8 kilometers (km), which is well within the troposphere (altitude $\leq 10-20$ km). Introduction of an average time delay of about 1.6 msec/km propagated for radio LD signal propagation in the troposphere can be introduced to provide an average compensation for time-delayed radio LD signals received at the radio LD units and at the outdoor LD unit. If the radio LD unit and the outdoor LD unit are transported together, the time delay for a given radio LD signal source will be the same for the radio LD unit and the outdoor LD unit. If the radio LD unit and the outdoor LD unit are separated and move independently, the time delay for each radio LD signal source must be estimated separately for each of these LD units.

We claim:

1. Apparatus for determining the present location of a mobile user that carries the apparatus inside or outside buildings and structures, the apparatus comprising:

a radio location determination (LD) module that receives radio LD signals from Q1 ($Q1 \geq 3$) terrestrial radio LD signal sources having known locations, that determines present location of the radio LD module from knowledge of relative phases of the radio LD signals as transmitted from the radio LD signal sources, that determines a radio LD signal indicium $I_{rad}$ that is a measure of at least one of (i) signal strength and (ii) signal quality of each of the radio LD signals received, and that issues radio LD module present location information and the radio LD signal indicium as radio LD output signals;

an outdoor LD module that receives outdoor LD signals from outdoor LD signal sources carried on Q2 ($Q2 \geq 3$) satellites with known orbits, that determines present location of the outdoor LD module from the outdoor LD signals received, that determines an outdoor LD signal indicium $I_{out}$ that is a measure of at least one of (i) signal strength and (ii) signal quality of each of the outdoor LD signals received, and that issues outdoor LD module present location information and the outdoor LD signal indicium as outdoor LD output signals;

a controller mechanism, including a microprocessor, that receives the radio LD output signals and the outdoor LD output signals, that compares $I_{rad}$ with a selected threshold value $I_{rad,thr}$, that compares $I_{out}$ with a selected threshold value $I_{out,thr}$, and that selects at most one of the radio LD signal present location information and the outdoor LD signal present location information to determine a present location of a user that carries the radio LD module and the outdoor LD module, based on the comparisons of $I_{rad}$ and $I_{out}$;

where the indicium $I_{rad}$ is determined by strengths $S_j(\text{rad})$ ($j=1, \ldots, Q1$) of signals received from the Q1 radio LD signal sources and is drawn from the class of indicia consisting of:

$$I_{\text{rad}} = \min\{S_1(\text{rad}), S_2(\text{rad}), \ldots, S_{Q1}(\text{rad})\}; \quad (i)$$

$$I_{\text{rad}} = \left\{\sum_{q=1}^{Q1} a_q S_q\right\} \bigg/ \left\{\sum_{q'=1}^{Q1} a_{q'}\right\}, \quad (ii)$$

where the coefficients $a_q$ are selected non-negative numbers and at least one coefficient $a_q$ is positive; and $$I_{\text{rad}} = \left\{\prod_{q=1}^{Q1} S_q(\text{rad})^{p(q)}\right\}^{1/P}, \text{ where } P = \sum_{q'=1}^{Q1} p(q'), \quad (iii)$$

the parameters $p(q)$ are non-negative numbers, and at least one parameter $p(q)$ is positive; and where the indicium $I_{out}$ is determined by strengths $S_j(\text{out})(j=1, \ldots, Q2)$ of signals received from the Q2 outdoor LD signal sources and is drawn from the class of indicia consisting of:

$$I_{out} = \min\{S_1(\text{out}), S_2(\text{out}), \ldots, S_{Q2}(\text{out})\}; \quad (i)$$

$$I_{out} = \left\{\sum_{q=1}^{Q2} b_q S_q\right\} \bigg/ \left\{\sum_{q'=1}^{Q2} b_{q'}\right\}, \quad (ii)$$

where the coefficients $b_q$ are selected non-negative numbers and at least one coefficient $b_q$ is positive; and $$I_{out} = \left\{\prod_{q=1}^{Q2} S_q(\text{out})^{r(q)}\right\}^{1/R}, \text{ where } R = \sum_{q'=1}^{Q2} r(q'), \quad (iii)$$

the parameters $r(q)$ are non-negative numbers, and at least one parameter $r(q)$ is positive.

2. The apparatus of claim 1, wherein said radio LD signals are FM subcarrier signals.

3. The apparatus of claim 1, wherein said outdoor LD sources are drawn from a class of telecommunication signal sources consisting of Global Positioning System and the Global Orbiting Navigation Satellite System.

4. The apparatus of claim 1, wherein said outdoor LD means and said radio LD means are spaced apart from each other by a distance of no more than a few meters.

5. The apparatus of claim 1, wherein said outdoor LD signal module determines said present location of said outdoor LD module by a procedure that includes the steps of:

measuring a pseudorange $PR(t;t0;j)$ associated with said outdoor LD signal received at said outdoor LD signal module from an outdoor LD signal source number j ($j=1, 2, \ldots, J; J \geq 3$);

determining a parameter b by minimizing an error sum defined by the relation $$\varepsilon(b) = \sum_{j=1}^{J} (\|C - x_j\| - PR(t; t0; j) + b)^2 / \sigma_j^2,$$

where C is an estimate of the three-dimensional coordinates of the receiver carried by said user, $x_j$ is the known three-dimensional coordinates of outdoor LD signal source number j, b/c is a clock offset for said outdoor LD signal module, c is the propagation velocity of light, and $\sigma_j^2$ is an estimated statistical variance of signals received by said outdoor LD signal module from signal source number j; and using the clock offset b/c to determine said present location of said outdoor LD signal module.

6. The apparatus of claim 1, wherein said controller mechanism compares said value $I_{rad}$ with said selected threshold value $I_{rad,thr}$ and compares said value $I_{out}$ with said selected threshold value $I_{out,thr}$ by forming a first ratio $u=(I_{rad}/I_{rad,thr})^{K1}$ if $(I_{rad}/I_{rad,thr}) \geq 1$ and u=0 if $(I_{rad}/I_{rad,thr})<1$, by forming a second ratio $v=(I_{out}/I_{out,thr})^{K2}$ if $(I_{out}/I_{out,thr}) \geq 1$ and v=0 if $(I_{out}/I_{out,thr})<1$, where K1 and K2 are selected positive numbers, by selecting said radio LD signals to determine said user present location if u>max(v,0), and by selecting said outdoor LD signals to determine said user present location if v>max(u,0).

7. The apparatus of claim 1, wherein said controller mechanism compares said value $I_{rad}$ with said selected threshold value $I_{rad,thr}$ and compares said value $I_{out}$ with said selected threshold value $I_{out,thr}$ by forming a first ratio $u=(I_{out}/I_{rad})$, by forming a second ratio $v=f(I_{rad})/I_{rad}$, where f(x) is a selected monotonic function of a variable x, by selecting said radio LD signals to determine said user present location if u>max(v,0), and by selecting said outdoor LD signals to determine said user present location if v>max(u,0).

8. Apparatus for determining the present location of a mobile user that carries the apparatus inside or outside buildings and structures, the apparatus comprising:

a radio location determination (LD) module that receives radio LD signals from Q1 (Q1≧3) terrestrial radio LD signal sources having known locations, that determines present location of the radio LD module from knowledge of relative phases of the radio LD signals as transmitted from the radio LD signal sources, that determines a radio LD signal indicium $S_{j,rad}$ that is a measure of at least one of (i) signal strength and (ii) signal quality of radio LD signal number j received (j=1, 2, . . . , Q1), that forms a first sequence of ratios $r'_j=(S_{j,rad}/S_{rad,thr})^{K1}$, where $S_{rad,thr}$ is a selected threshold value and K1 is a selected positive number, and that issues radio LD module present location information and the radio LD signal indicium as radio LD output signals;

an outdoor LD module that receives outdoor LD signals from outdoor LD signal sources carried on Q2 (Q2≧3) satellites with known orbits, that determines present location of the outdoor LD module from the outdoor LD signals received, that determines an outdoor LD signal indicium $S_{j,out}$ that is a measure of at least one of (i) signal strength and (ii) signal quality of outdoor LD signal number k received (k=1, 2, . . . , Q2), that forms a second sequence of ratios $r''_k=(S_{k,out}/S_{out,thr})^{K2}$, where $S_{out,thr}$ is a selected threshold value and K2 is a selected positive number, and that issues outdoor LD module present location information and the outdoor LD signal indicium as outdoor LD output signals; and a controller mechanism, including a microprocessor, that receives the radio LD output signals and the outdoor LD output signals, that arranges the indicia ratios $r'_j$ and the indicia ratios $r''_k$ in a third monotonically increasing sequence that includes all the indicia ratios from the first and second sequences, and that uses the radio LD signals (j) and the outdoor LD signals (k), corresponding to M highest ratio values in the third sequence, where M is a selected positive integer, to estimate a present location of a user of the apparatus.

9. Apparatus for determining the present location of a mobile user that carries the apparatus inside or outside buildings and structures, the apparatus comprising:

a radio location determination (LD) module that receives radio LD signals from Q1 (Q1≧3) terrestrial radio LD signal sources having known locations, that determines present location of the radio LD module from knowledge of relative phases of the radio LD signals as transmitted from the radio LD signal sources, that determines a radio LD signal indicium $S_{j,rad}$ that is a measure of at least one of (i) signal strength and (ii) signal quality of radio LD signal number j received (j=1, 2, . . . , Q1), that forms a first sequence of differences $r'_j=(S_{j,rad}-S_{rad,thr})K1$, where $S_{rad,thr}$ is a selected threshold value and K1 is a selected positive number, for each signal indicium $S_{j,rad}$ that is at least as large as $S_{rad,thr}$, and that issues radio LD module present location information and the radio LD signal indicium as radio LD output signals;

an outdoor LD module that receives outdoor LD signals from outdoor LD signal sources carried on Q2 (Q2≧3) satellites with known orbits, that determines present location of the outdoor LD module from the outdoor LD signals received, that determines an outdoor LD signal indicium $S_{j,out}$ that is a measure of at least one of (i) signal strength and (ii) signal quality of outdoor LD signal number k received (k=1, 2, . . . , Q2), that forms a second sequence of differences $r''_k=(S_{k,out}-S_{out,thr})^{K2}$, where $S_{out,thr}$ is a selected threshold value and K2 is a selected positive number, for each signal indicium $S_{k,out}$ that is at least as large as $S_{out,thr}$, and that issues outdoor LD module present location information and the outdoor LD signal indicium as outdoor LD output signals; and a controller mechanism, including a microprocessor, that receives the radio LD output signals and the outdoor LD output signals, that arranges the indicia differences $r'_j$ and the indicia differences $r''_k$ in a third monotonically increasing sequence that includes all the indicia differences from the first and second sequences, and that uses the radio LD signals (j) and the outdoor LD signals (k), corresponding to M highest ratio values in the third sequence, where M is a selected positive integer, to estimate a present location of a user of the apparatus.

10. A method for determining the present location of a mobile user that carries the apparatus inside or outside buildings and structures, the method comprising the steps of:

receiving radio location determination (LD) signals at a radio LD module, from Q1 (Q1≧3) terrestrial radio LD signal sources having known locations, determining present location of the radio LD module from knowledge of relative phases of the radio LD signals as transmitted from the radio LD signal sources, determining at least one radio LD signal indicium $I_{rad}$ that is a measure of at least one of (i) signal strength and (ii) signal quality of the radio LD signals received, and issuing radio LD antenna present location information and the radio LD signal indicium as radio LD output signals;

receiving outdoor LD module signals at an outdoor LD signal module from outdoor LD signal sources carried on at least three satellites with known orbits, determining present location of the outdoor LD module from the outdoor LD signals received, determining at least one outdoor LD signal indicium $I_{out}$ that is a measure of at least one of (i) signal strength and (ii) signal quality of the outdoor LD signals received, and issuing outdoor LD module present location information and the outdoor LD signal indicium as outdoor LD output signals;

receiving the radio LD output signals and the outdoor LD output signals, comparing $I_{rad}$ with a selected threshold value $I_{rad,thr}$, comparing $I_{out}$ with a selected threshold value $I_{out,thr}$, and selecting at most one of the radio LD signal present location information and the outdoor LD signal present location information to determine a present location of a user that carries the radio LD module and the outdoor LD module, based on the comparisons of $I_{rad}$ and $I_{out}$;

where the indicium $I_{rad}$ is determined by strengths $S_j(\text{rad})$ (j=1, ..., Q1) of signals received from the Q1 radio LD signal sources and is drawn from the class of indicia consisting of:

$$I_{\text{rad}} = \min\{S_1(\text{rad}), S_2(\text{rad}), ..., S_{Q1}(\text{rad})\}; \quad \text{(i)}$$

$$I_{\text{rad}} = \left\{\sum_{q=1}^{Q1} a_q S_q\right\} \bigg/ \left(\sum_{q'=1}^{Q1} a_{q'}\right), \quad \text{(ii)}$$

where the coefficients $a_q$ are selected non-negative numbers and at least one coefficient $a_q$ is positive; and $$I_{\text{rad}} = \left\{\prod_{q=1}^{Q1} S_q(\text{rad})^{p(q)}\right\}^{1/P}, \text{ where } P = \sum_{q'=1}^{Q1} p(q'), \quad \text{(iii)}$$

the parameters p(q) are non-negative numbers, and at least one parameter p(q) is positive; and where the indicium $I_{out}$ is determined by strengths $S_j(\text{out})$ (j=1, ..., Q2) of signals received from the Q2 outdoor LD signal sources and is drawn from the class of indicia consisting of:

$$I_{\text{out}} = \min\{S_1(\text{out}), S_2(\text{out}), ..., S_{Q2}(\text{out})\}; \quad \text{(i)}$$

$$I_{\text{out}} = \left\{\sum_{q=1}^{Q2} b_q S_q\right\} \bigg/ \left(\sum_{q'=1}^{Q2} b_{q'}\right), \quad \text{(ii)}$$

where the coefficients $b_q$ are selected non-negative numbers and at least one coefficient $b_q$ is positive; and $$I_{\text{out}} = \left\{\prod_{q=1}^{Q2} S_q(\text{out})^{r(q)}\right\}^{1/R}, \text{ where } R = \sum_{q'=1}^{Q2} r(q'), \quad \text{(iii)}$$

the parameters r(q) are non-negative numbers, and at least one parameter r(q) is positive.

11. The method of claim 10, further comprising the step of choosing said radio LD signals to be FM subcarrier signals.

12. The method of claim 10, further comprising the step of drawing said outdoor LD sources from a class of telecommunication signal sources consisting of the Global Positioning System and the Global Orbiting Navigation Satellite System.

13. The method of claim 10, further comprising the step of spacing said outdoor LD means and said radio LD means apart from each other by a distance of no more than a few meters.

14. The method of claim 10, wherein said step of determining said present location of said outdoor LD module comprises the steps of:

measuring a pseudorange PR(t;t0;j) associated with said outdoor LD signal received at said outdoor LD signal module from an outdoor LD signal source number j (j=1, 2, ..., J; J≧3);

determining a parameter b by minimizing an error sum defined by the relation $$\varepsilon(b) = \sum_{j=1}^{J} (\|C - x_j\| - PR(t; t0; j) + b)^2 / \sigma_j^2,$$

where C is an estimate of the three-dimensional coordinates of the receiver carried by said user, $x_j$ is the known three-dimensional coordinates of outdoor LD signal source number j, b/c is a clock offset for said outdoor LD signal module, c is the propagation velocity of light, and $\sigma_j^2$ is an estimated statistical variance of signals received by said outdoor LD signal module from signal source number j; and using the clock offset b/c to determine said present location of said outdoor LD signal module.

15. The method of claim 10, wherein said step of comparing said value $I_{rad}$ with said selected threshold value $I_{rad,thr}$ and said step of comparing said value $I_{out}$ with said selected threshold value $I_{out,thr}$ comprises:

forming a first ratio $u=(I_{rad}/I_{rad,thr})^{K1}$ if $(I_{rad}/I_{rad,thr}) \geq 1$ and u=0 if $(I_{rad}/I_{rad,thr})<1$, forming a second ratio $v=(I_{out}/I_{out,thr})^{K2}$ if $(I_{out}/I_{out,thr}) \geq 1$ and v=0 if $(I_{out}/I_{out,thr})<1$, where K1 and K2 are selected positive numbers, selecting said radio LD signals to determine said user present location if u>max(v,0), and selecting said outdoor LD signals to determine said user present location if v>max(u,0).

16. The method of claim 10, wherein said step of comparing said value $I_{rad}$ with said selected threshold value $I_{rad,thr}$ and said step of comparing said value $I_{out}$ with said selected threshold value $I_{out,thr}$ comprises:

forming a first ratio $u=(I_{out}/I_{rad})$, forming a second ratio $v=f(I_{rad})/I_{rad}$, where f(x) is a selected monotonic function of a variable x, selecting said radio LD signals to determine said user present location if u>max(v,0), and selecting said outdoor LD signals to determine said user present location if v>max(u,0).

17. A method for determining the present location of a mobile user that carries the apparatus inside or outside buildings and structures, the method comprising the steps of:

receiving radio LD signals at a radio LD module from Q1 (Q1≧3) terrestrial radio LD signal sources having known locations, determining present location of the radio LD module from knowledge of relative phases of the radio LD signals as transmitted from the radio LD signal sources, determining a radio LD signal indicium $S_{j,rad}$ that is a measure of at least one of (i) signal strength and (ii) signal quality of radio LD signal number j received (j=1, 2, ..., Q1), forming a first sequence of ratios $r'_j=(S_{j,rad}/S_{rad,thr})^{K1}$, where $S_{rad,thr}$ is a selected threshold value and K1 is a selected positive number, and issuing radio LD module present location information and the radio LD signal indicium as radio LD output signals;

receiving outdoor LD signals at an outdoor LD module from outdoor LD signal sources carried on Q2 (Q2≧3) satellites with known orbits, determining present location of the outdoor LD module from the outdoor LD signals received, determining an outdoor LD signal indicium $S_{j,out}$ that is a measure of at least one of (i) signal strength and (ii) signal quality of outdoor LD signal number k received (k=1, 2, . . . , Q2), forming a second sequence of ratios $r''_{k}=(S_{k,out}/S_{out,thr})^{K2}$, where $S_{out,thr}$ is a selected threshold value and K2 is a selected positive number, and issuing outdoor LD module present location information and the outdoor LD signal indicium as outdoor LD output signals; and receiving the radio LD output signals and the outdoor LD output signals, arranging the indicia ratios $r'_j$ and the indicia ratios $r''_k$ in a third monotonically increasing sequence that includes all the indicia ratios from the first and second sequences, and that uses the radio LD signals (j) and the outdoor LD signals (k), corresponding to M highest ratio values in the third sequence, where M is a selected positive integer, to estimate a present location of a user of the radio LD module and the outdoor LD module.

18. A method for determining the present location of a mobile user that carries the apparatus inside or outside buildings and structures, the method comprising the steps of:

receiving radio LD signals at a radio LD module from Q1 (Q1≧3) terrestrial radio LD signal sources having known locations, determining present location of the radio LD module from knowledge of relative phases of the radio LD signals as transmitted from the radio LD signal sources, determining a radio LD signal indicium $S_{j,rad}$ that is a measure of at least one of (i) signal strength and (ii) signal quality of radio LD signal number j received (j=1, 2, . . . , Q1), forming a first sequence of differences $r'_j=(S_{j,rad}-S_{rad,thr})K1$, where $S_{rad,thr}$ is a selected threshold value and K1 is a selected positive number, for each signal indicium $S_{j,rad}$ that is at least as large as $S_{rad,thr}$, and issuing radio LD module present location information and the radio LD signal indicium as radio LD output signals;

receiving outdoor LD signals at an outdoor LD module from outdoor LD signal sources carried on Q2 (Q2≧3) satellites with known orbits, determining present location of the outdoor LD module from the outdoor LD signals received, determining an outdoor LD signal indicium $S_{j,out}$ that is a measure of at least one of (i) signal strength and (ii) signal quality of outdoor LD signal number k received (k=1, 2, . . . , Q2), forming a second sequence of differences $r''_k=(S_{k,out}-S_{out,thr})^{K2}$, where $S_{out,thr}$ is a selected threshold value and K2 is a selected positive number, for each signal indicium $S_{k,out}$ that is at least as large as $S_{out,thr}$, and issuing outdoor LD module present location information and the outdoor LD signal indicium as outdoor LD output signals; and receiving the radio LD output signals and the outdoor LD output signals, arranging the indicia ratios $r'_j$ and the indicia ratios $r''_k$ in a third monotonically increasing sequence that includes all the indicia ratios from the first and second sequences, and that uses the radio LD signals (j) and the outdoor LD signals (k), corresponding to M highest ratio values in the third sequence, where M is a selected positive integer, to estimate a present location of a user of the radio LD module and the outdoor LD module.

* * * * *